United States Patent
Nishiguchi et al.

(10) Patent No.: US 10,101,065 B2
(45) Date of Patent: Oct. 16, 2018

(54) HEAT TRANSMISSION METHOD AND HIGH-TEMPERATURE HEAT PUMP DEVICE

(71) Applicant: CENTRAL GLASS COMPANY, LIMITED, Yamaguchi (JP)

(72) Inventors: Yoshio Nishiguchi, Saitama (JP); Satoru Okamoto, Saitama (JP); Masatomi Kanai, Saitama (JP)

(73) Assignee: CENTRAL GLASS COMPANY, LIMITED, Ube, Yamaguchi (JP)

( * ) Notice: Subject to any disclaimer, the term of this patent is extended or adjusted under 35 U.S.C. 154(b) by 204 days.

(21) Appl. No.: 15/043,009

(22) Filed: Feb. 12, 2016

(65) Prior Publication Data

US 2016/0178254 A1 Jun. 23, 2016

Related U.S. Application Data

(63) Continuation of application No. PCT/JP2014/071283, filed on Aug. 12, 2014.

(30) Foreign Application Priority Data

Aug. 14, 2013 (JP) ................................. 2013-168753

(51) Int. Cl.
*C09K 5/04* (2006.01)
*F25B 30/02* (2006.01)

(52) U.S. Cl.
CPC .............. *F25B 30/02* (2013.01); *C09K 5/044* (2013.01); *C09K 5/045* (2013.01);
(Continued)

(58) Field of Classification Search
CPC .............. C09K 5/045; C09K 2205/126; C09K 2205/22
See application file for complete search history.

(56) References Cited

U.S. PATENT DOCUMENTS

2010/0044619 A1 2/2010 Hulse et al.
2013/0205824 A1 8/2013 Morimoto et al.
(Continued)

FOREIGN PATENT DOCUMENTS

JP H03-503206 A 7/1991
JP 2007-535611 A 12/2007
(Continued)

OTHER PUBLICATIONS

Shuichi Umezawa et al, "Development of a Heat Recovery Centrifugal Heat Pump Producing High Temperature Water", Transactions of the Japan Society of Mechanical Engineers (B), Mar. 2013, pp. 423-430, vol. 79 No. 799, Japan.
(Continued)

*Primary Examiner* — John R Hardee
(74) *Attorney, Agent, or Firm* — Hauptman Ham, LLP

(57) ABSTRACT

A heat transmission method using a heat pump system according to the present invention uses a heat transmission medium containing at least one compound represented by general formula (1). In the formula, $R^1$ is a $CH_mF_{3-m}$ group, m is an integer of 0 or more and 3 or less, $R^2$, $R^3$ and $R^4$ are each independently a fluorine atom, a chlorine atom, a bromine atom, an iodine atom or a hydrogen atom, and at least one fluorine atom is contained in a molecule. The heat transmission method includes (A) step of gasifying the heat transmission medium; (B) step of compressing the heat transmission medium into a supercritical state; (C) step of causing heat exchange between the heat transmission medium in the supercritical state and a medium to be heated; and (D) step of decreasing the pressure of the heat transmission medium.

18 Claims, 20 Drawing Sheets

(52) U.S. Cl.
CPC .. *C09K 2205/126* (2013.01); *F25B 2400/121* (2013.01); *Y02P 20/544* (2015.11)

(56) References Cited

U.S. PATENT DOCUMENTS

| | | | |
|---|---|---|---|
| 2014/0223935 A1 | | 8/2014 | Rached |
| 2016/0137895 A1* | | 5/2016 | Kontomaris ............. F25B 7/00 62/114 |
| 2016/0244651 A1* | | 8/2016 | Leck ..................... C09K 5/045 |

FOREIGN PATENT DOCUMENTS

| | | |
|---|---|---|
| JP | 2009-085540 A | 4/2009 |
| JP | 2010-047754 A | 3/2010 |
| JP | 2010-519401 A | 6/2010 |
| JP | 2011-168781 A | 9/2011 |
| JP | 2013-049859 A | 3/2013 |
| JP | 2013-087187 A | 5/2013 |
| JP | 2013-525720 A | 6/2013 |
| JP | 2014-529661 A | 11/2014 |
| WO | 90/007683 A1 | 7/1990 |
| WO | 2005/105947 A2 | 11/2005 |
| WO | 2007/002625 A2 | 1/2007 |
| WO | 2008/106423 A1 | 9/2008 |
| WO | 2011/101621 A2 | 8/2011 |
| WO | 2011/114029 A1 | 9/2011 |
| WO | 2012/077156 A1 | 6/2012 |
| WO | 2012/082939 A1 | 6/2012 |
| WO | 2013/030476 A1 | 3/2013 |

OTHER PUBLICATIONS

International Search Report dated Nov. 4, 2014 concerning PCT/JP2014/071283.
Written Opinion of the International Search Authority dated Nov. 4, 2014, concerning PCT/JP/2014/071283.
Japanese Office Action dated Oct. 31, 2017 for the corresponding Japanese application No. 2015-531822.
English Translation of the Written Opinion of the International Search Authority dated Nov. 4, 2014, concerning PCT/JP/2014/071283 previously filed on Feb. 12, 2016.
Japanese Office Action dated Jul. 10, 2018 for the corresponding Japanese application No. 2015-531822 with partial English translation.

\* cited by examiner

HEAT TRANSMISSION METHOD AND HIGH-TEMPERATURE HEAT PUMP DEVICE

CROSS REFERENCE TO RELATED APPLICATIONS

This application is based upon and claims the benefit of priority from the prior Japanese Patent Application No. 2013-168753, filed on Aug. 14, 2013, PCT Application No. PCT/JP2014/071283, filed on Aug. 12, 2014 and the entire contents of which are incorporated herein by reference.

FIELD

The present invention relates to a heat transmission method using a heat pump system and also to a high-temperature heat pump device.

BACKGROUND

In steel, petroleum, chemical, cement, paper and pulp, ceramic engineering, biomass and other industries, a once through steam boiler or the like is used, which generates steam by use of heat of combustion of a fossil fuel such as oil, gas or the like in order to supply a heat source for a heating step such as a drying step, a sterilization step or the like. Recently, energy savings and carbon dioxide emissions reduction are serious problems in industries. It is considered that a heating method using a heat pump reduces carbon dioxide emissions as compared with a conventional method of combusting a fossil fuel to supply heat.

A heat pump is generally used for cooling or heating in an air conditioning device or a hot water supply device.

Chlorofluorocarbon (CFC) or hydrochlorofluorocarbon (HCFC) each containing fluorine and chlorine are conventionally used as a coolant of a heat pump cycle, but use thereof has been stopped step by step from the viewpoint of ozone layer protection. Today, a natural coolant such as ammonia, carbon dioxide or the like and hydrofluorocarbon (HFC), which does not contain a chlorine atom in a molecule, are mainly used.

A known heat pump for hot water supply uses carbon dioxide as a coolant. For example, PCT Japanese National Phase Laid-Open Patent Publication No. Hei 3-503206 discloses a heat pump for hot water supply that adopts a transcritical cycle using carbon dioxide as a coolant. The critical temperature of carbon dioxide is 30.98° C., and the critical pressure thereof is 7.38 MPa.

A heat pump known as a hot water supply device or a steam generation device uses HFC as a coolant. For example, PCT Japanese National Phase Laid-Open Patent Publication No. 2013-525720 discloses a coolant for a high-temperature heat pump, which has a condensation temperature of 70° C. to 150° C. This coolant is a mixture of 1,1,1,3,3-pentafluoropropane (HFC-245fa) and 1,1,1,3,3-pentafluorobutane (HFC-365mfc), and has a critical temperature higher than 150° C.

A heat pump known as a superheated steam generation device uses 1,1,1,2-tetrafluoroethane (HFC-134a) as a coolant. For example, Japanese Laid-Open Patent Publication No. 2009-85540 discloses a turbo compressor that compresses HFC-134a into a supercritical state and a high-temperature heat pump that causes heat exchange between HFC-134a in the supercritical state and water to generate superheated steam having a temperature of 120° C. The critical temperature of HFC-134a is 101.06° C., and the critical pressure thereof is 4.06 MPa.

Transactions of JSME (The Japan Society of Mechanical Engineering) (B) Vol. 79, No. 799 pp. 423-430 discloses a turbo compressor that compresses HFC-134a into a supercritical state and a high-temperature heat pump that causes heat exchange between HFC-134a in the supercritical state and compressed water to generate pressurized hot water having a temperature of 130° C. In Transactions of JSME (The Japan Society of Mechanical Engineering) (B) Vol. 79, No. 799 pp. 423-430, HFC-134a, which is used as a single coolant, is compressed by the turbo compressor from 1.2 MPa at 70° C. (inlet of the compressor) to 5.0 MPa at 145° C. (outlet of the compressor). In order to suppress the increase in the pressure of the gas discharged from the compressor, an intercooler is provided, so that the degree of superheat of the coolant at the inlet of the compressor is 22° C. (with respect to the evaporation temperature of 48° C., the temperature of the coolant at the inlet of the compressor is 70° C.). FIG. 4 of Transactions of JSME (The Japan Society of Mechanical Engineering) (B) Vol. 79, No. 799 pp. 423-430 suggests that in the case where the intercooler is not provided in the above-described superheated steam generation device, the pressure of HFC-134a gas having a temperature of 145° C. at the outlet of the compressor exceeds 5.0 MPa.

However, it is concerned that HFC, which has a high global warming potential (GWP), significantly contributes to the warming. Therefore, hydrofluoroolefin (HFO), which is a fluorine-containing unsaturated compound, is proposed as a substitute coolant having a low global warming potential.

For example, PCT Japanese National Phase Laid-Open Patent Publication No. 2007-535611 discloses using, as a working medium of an air conditioning device for an automobile, a composition containing 2,3,3,3-tetrafluoropropene (HFO-1234yf) and polyalkyleneglycol (PAG) lubricant.

Japanese Laid-Open Patent Publication No. 2010-47754 discloses using, as a working fluid of a low-temperature freezer, a mixed compound of tetrafluoropropene such as 2,3,3,3-tetrafluoropropene (HFO-1234yf), 1,3,3,3-tetrafluoropropene (HFO-1234ze) or the like and difluoromethane.

Patent Literature 6 discloses using difluoromethane (R-32) or a mixed coolant containing R-32 and tetrafluoropropene (HFO-1234yf or HFO-1234ze) in order to replace a medium in a freezing cycle of increasing the temperature of water used as a second heating medium to 70° C.

SUMMARY

PCT Japanese National Phase Laid-Open Patent Publication No. Hei 3-503206 proposes a heat pump of a transcritical cycle that uses carbon dioxide as a coolant. With this heat pump, the pressure of the coolant in a supercritical state at a temperature necessary to generate superheated steam is very high. Therefore, a heat exchanger that generates the superheated steam by heat exchange needs to have a high level of pressure resistance, which presents a problem that the heat exchanger costs high.

PCT Japanese National Phase Laid-Open Patent Publication No. 2013-525720 proposes an HFC mixed coolant for a high-temperature heat pump. Since this coolant has a high global warming potential of 790 to 1030, it is concerned that use thereof for a long time in the future may cause a problem.

Japanese Laid-Open Patent Publication No. 2009-85540 and Transactions of JSME (The Japan Society of Mechanical Engineering) (B) Vol. 79, No. 799 pp. 423-430 each propose a turbo compression-type high-temperature heat pump using a transcritical cycle of HFC-134a. Since HFC-134a has a high global warming potential of 1340, it is concerned that use thereof for a long time in the future may cause a problem. In general, when the condensation pressure of a coolant exceeds 5.0 MPa, the compressor, the condenser and pipes need to have a high level of pressure resistance. This is not preferable because the devices having such a high level of pressure resistance cost high. In order to increase the temperature of HFC-134a to 145° C. at a pressure of 5.0 MPa or lower, the degree of superheat of HFC-134a needs to be made large by, for example, provision of an intercooler.

PCT Japanese National Phase Laid-Open Patent Publication No. 2007-535611 and Japanese Laid-Open Patent Publication No. 2010-47754 each propose an air conditioning device of a steam compression cycle using a working fluid having a low global warming potential. The working fluid used in each of PCT Japanese National Phase Laid-Open Patent Publication No. 2007-535611 and Japanese Laid-Open Patent Publication No. 2010-47754 is a coolant suitable for use in air conditioning (cooling, heating). However, no example of applying such a coolant to a heat pump cycle for hot water supply or water vapor generation is described.

The mixed coolant disclosed in Patent Literature 6 is not sufficient to satisfy an increasing demand for heat supply at a higher temperature. In order to supply steam-containing heat having a temperature of 80° C. or higher, further studies of heat transmission mediums and development of heat transmission methods are required. R-32, which is contained in the mixed coolant disclosed in Patent Literature 6, has a high global warming potential of 670. A method for reducing the load on the environment is required.

As described above, currently, a high-temperature heat pump that is suitable to supply heat having a temperature of 80° C. or higher while using a coolant having a high level of environmental compatibility has insufficient performance. Therefore, it is desired to find a heat transmission medium that uses a coolant having a low global warming potential and transmits heat having a temperature of 80° C. or higher at a pressure of 5.0 MPa or lower.

The present invention made in light of such a situation of the conventional art has an object of providing a heat transmission method and a high-temperature heat pump device that use a non-flammable or slightly flammable medium having little load on the environment and provide superb heat cycle characteristics and heat transmission characteristics.

The present inventors performed active studies in order to solve the above-described problems. As a result, the present inventors paid attention to unsaturated halogenated hydrocarbon, and obtained knowledge that use thereof, especially, use of fluorinated propene as a heat transmission medium in a supercritical state at a predetermined temperature and a predetermined pressure would provide a very effective heat transmission method. Thus, the present invention was completed.

An embodiment of the present invention is directed to a heat transmission method using a heat pump system, the heat transmission method using a heat transmission medium containing at least one compound represented by general formula (1):

[Chemical formula 1]

(1)

where $R^1$ is a $CH_mF_{3-m}$ group, m is an integer of 0 or more and 3 or less, $R^2$, $R^3$ and $R^4$ are each independently a fluorine atom, a chlorine atom, a bromine atom, an iodine atom or a hydrogen atom, and at least one fluorine atom is contained in a molecule];

the heat transmission method comprising:
(A) step of gasifying the heat transmission medium;
(B) step of compressing the heat transmission medium into a supercritical state;
(C) step of causing heat exchange between the heat transmission medium in the supercritical state and a medium to be heated; and
(D) step of decreasing the pressure of the heat transmission medium.

In the heat transmission method, in step (C), the medium to be heated may be heated to 80° C. or higher.

In the heat transmission method, in step (C), the medium to be heated may be heated to 100° C. or higher.

In the heat transmission method, in step (C), the medium to be heated may be heated to 150° C. or higher.

In the heat transmission method, in step (C), the medium to be heated may be heated to 170° C. or higher.

The heat transmission method may further include a step (E) of supplying the heat transmission medium to step (A).

In the heat transmission method, at least one compound represented by the general formula (1) may be contained at 50% by mass or more.

In the heat transmission method, the at least one compound represented by the general formula (1) may be selected from the group consisting of 2,3,3,3-tetrafluoropropene (HFO-1234yf), trans-1,3,3,3-tetrafluoropropene (HFO-1234ze(E)), and cis-1,3,3,3-tetrafluoropropene (HFO-1234ze(Z)).

In the heat transmission method, the at least one compound represented by the general formula (1) may be selected from the group consisting of trans-1-chloro-3,3,3-trifluoropropene (HCFO-1233zd(E)), cis-1-chloro-3,3,3-trifluoropropene (HCFO-1233zd(Z)), and 2-chloro-3,3,3-trifluoropropene (HCFO-1233xf).

In the heat transmission method, the at least one compound represented by the general formula (1) may be selected from the group consisting of trans-1,2-dichloro-3,3,3-trifluoropropene (HCFO-1223xd(E)), cis-1,2-dichloro-3,3,3-trifluoropropene (HCFO-1223xd(Z)), 1,1-dichloro-3,3,3-trifluoropropene (HCFO-1223za), and 1,1,2-trichloro-3,3,3-trifluoropropene (HCFO-1223xf).

In the heat transmission method, the at least one compound represented by the general formula (1) may be selected from the group consisting of trans-1-bromo-3,3,3-trifluoropropene, cis-1-bromo-3,3,3-trifluoropropene, 2-bromo-3,3,3-trifluoropropene, trans-2-bromo-1,3,3,3-tetrafluoropropene, and cis-2-bromo-1,3,3,3-tetrafluoropropene.

In the heat transmission method, the heat transmission medium may contain cis-1,3,3,3-tetrafluoropropene (HFO-1234ze(E)) at 80% by mass or more and 99% by mass or less and contain 1,1,1,3,3-pentafluoropropane (HFO-245fa) at 1% by mass or more and 20% by mass or less.

In the heat transmission method, the heat transmission medium may contain cis-1,3,3,3-tetrafluoropropene (HFO-1234ze(E)) at 50% by mass or more and 99% by mass or less and contain trans-1-chloro-3,3,3-trifluoropropene (HCFO-1233zd(E)) at 1% by mass or more and 50% by mass or less.

In the heat transmission method, the heat transmission medium may contain cis-1,3,3,3-tetrafluoropropene (HFO-1234ze(E)) at 50% by mass or more and 98% by mass or less, contain 1,1,1,3,3-pentafluoropropane (HFO-245fa) at 1% by mass or more and 20% by mass or less, and contain trans-1-chloro-3,3,3-trifluoropropene (HCFO-1233zd(E)) at 1% by mass or more and 49% by mass or less.

In the heat transmission method, the heat transmission medium may contain cis-1,3,3,3-tetrafluoropropene (HFO-1234ze(Z)) at 50% by mass or more and 99% by mass or less and contain cis-1-chloro-3,3,3-trifluoropropene (HCFO-1233zd(Z)) at 1% by mass or more and 50% by mass or less.

In the heat transmission method, the heat transmission medium may contain cis-1,3,3,3-tetrafluoropropene (HFO-1234ze(Z)) at 65% by mass or more and 99% by mass or less and contain 2,3,3,3-tetrafluoropropene (HFO-1234yf) at 1% by mass or more and 35% by mass or less.

In the heat transmission method, the heat transmission medium may contain cis-1,3,3,3-tetrafluoropropene (HFO-1234ze(Z)) at 60% by mass or more and 99% by mass or less and contain trans-1,3,3,3-tetrafluoropropene (HFO-1234ze(E)) at 1% by mass or more and 40% by mass or less.

In the heat transmission method, the heat transmission medium may contain a lubricant.

In the heat transmission method, the lubricant may be selected from mineral oil (paraffin-based oil or naphthene-based oil) and synthetic oils including alkylbenzenes (AB), poly(alfa-olefin), esters, polyolesters (POE), polyalkyleneglycols (PAG), polyvinylethers (PVE), and a combination thereof.

In the heat transmission method, the heat transmission medium may further contain a stabilizer.

In the heat transmission method, the stabilizer may be selected from nitro compounds, epoxy compounds, phenols, imidazoles, amines, diene-based compounds, phosphates, aromatic unsaturated hydrocarbons, isoprenes, propadienes, terpenes, and the like, and a combination thereof.

In the heat transmission method, the heat transmission medium may further contain a flame retardant.

In the heat transmission method, the flame retardant may be selected from phosphates, halogenated aromatic compounds, fluorinated iodocarbon, fluorinated bromocarbon, and the like, and a combination thereof.

An embodiment of the present invention is directed to a high-temperature heat pump device using the heat transmission method described in any of the above.

The high-temperature heat pump device may generate warm water, pressurized hot water or superheated steam of 80° C. or higher.

The high-temperature heat pump device may generate pressurized hot water or superheated steam of 100° C. or higher.

The high-temperature heat pump device may generate pressurized hot water or superheated steam of 130° C. or higher.

The high-temperature heat pump device may generate pressurized hot water or superheated steam of 150° C. or higher.

The high-temperature heat pump device may generate pressurized hot water or superheated steam of 170° C. or higher.

In the heat transmission method, the compound represented by the general formula (1) may be 2,3,3,3-tetrafluoropropene (HFO-1234yf), and in a supercritical state of HFO-1234yf generated in the step of compressing the heat transmission medium, the temperature may be 94.7° C. or higher and 200° C. or lower and the pressure may be 3.38 MPa or higher and 5.0 MPa or lower.

In the heat transmission method, the compound represented by the general formula (1) may be trans-1,3,3,3-tetrafluoropropene (HFO-1234ze(E)), and in a supercritical state of HFO-1234ze(E) generated in the step of compressing the heat transmission medium, the temperature may be 109.4° C. or higher and 200° C. or lower and the pressure may be 3.63 MPa or higher and 5.0 MPa or lower.

In the heat transmission method, the compound represented by the general formula (1) may be cis-1,3,3,3-tetrafluoropropene (HFO-1234ze(Z)), and in a supercritical state of HFO-1234ze(Z) generated in the step of compressing the heat transmission medium, the temperature may be 150.1° C. or higher and 250° C. or lower and the pressure may be 3.54 MPa or higher and 5.0 MPa or lower.

In the heat transmission method, the compound represented by the general formula (1) may be trans-1-chloro-3,3,3-trifluoropropene (HCFO-1233zd(E)), and in a supercritical state of HCFO-1233zd(E) generated in the step of compressing the heat transmission medium, the temperature may be 165.6° C. or higher and 250° C. or lower and the pressure may be 3.77 MPa or higher and 5.0 MPa or lower.

REFERENCE SIGNS LIST

Figure 1:
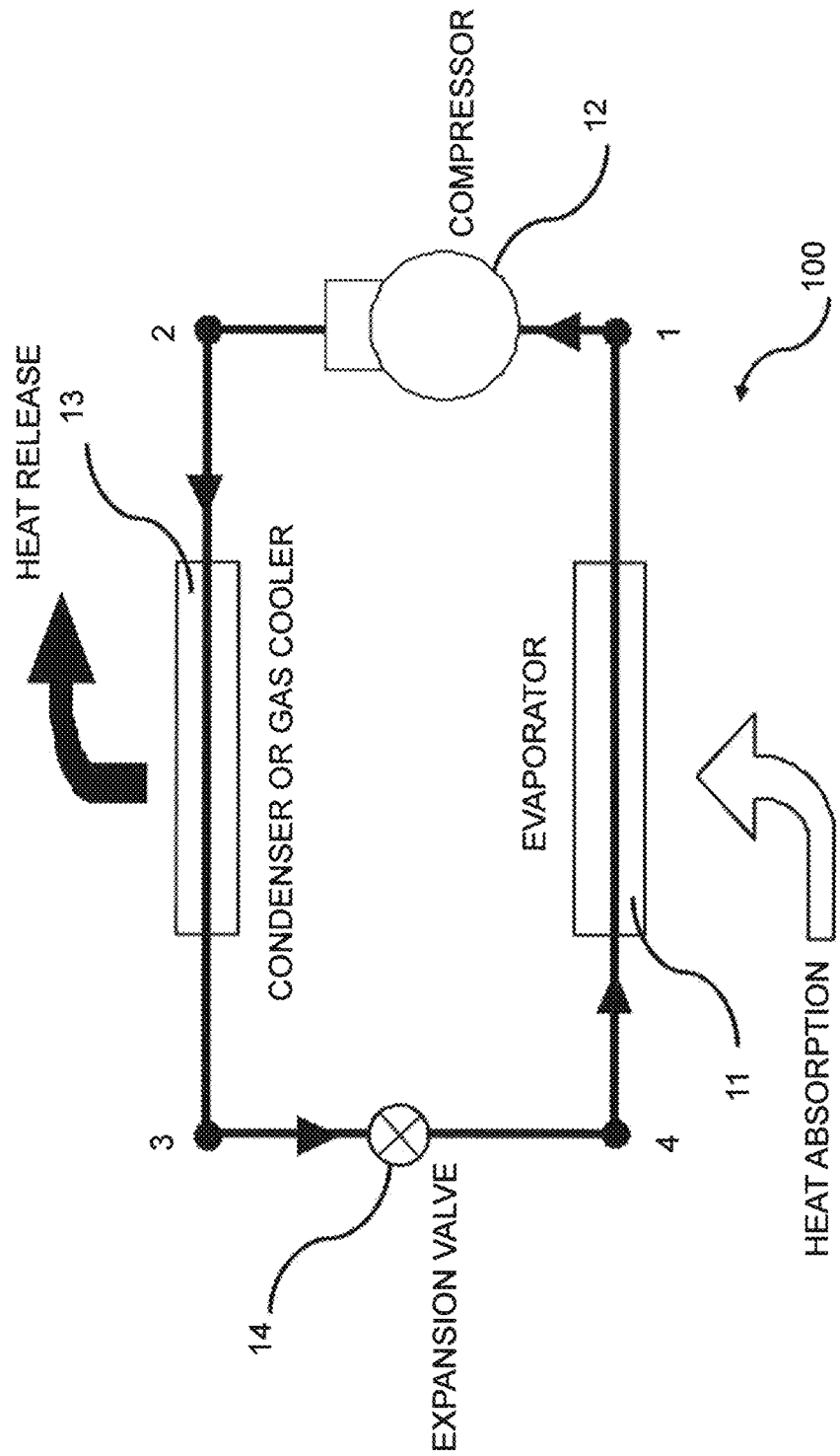
FIG. 1 is a schematic view of a high-temperature heat pump cycle to which a heat transmission medium according to the present invention is applicable.

11: evaporator; 12: compressor; 13: condenser; 14: expansion valve; 100: high-temperature heat pump device

EMBODIMENTS

Hereinafter, a heat transmission method and a high-temperature heat pump device according to the present invention will be described with reference to the drawings. The heat transmission method and the high-temperature heat pump device according to the present invention are not to be construed as being limited to the following embodiments or examples. In the drawings referred to in the embodiments and the examples, the same elements or elements having substantially the same functions will bear the same reference signs, and descriptions thereof will not be described in repetition.

A heat transmission medium according to the present invention usable as a working medium for a heat cycle contains at least one of specific fluorinated olefins (fluorine-containing unsaturated hydrocarbons). A compound contained in the heat transmission medium according to the present invention is represented by the following general formula (2).

[Chemical formula 2]

$$R^1R^2C=CR^3R^4 \qquad (2)$$

[in the formula, $R^1$ is a $CH_mF_{3-m}$ group, m is an integer of 0 or more and 3 or less, $R^2$, $R^3$ and $R^4$ are each independently a fluorine atom, a chlorine atom, a bromine atom, an iodine atom or a hydrogen atom, and at least one fluorine atom is contained in a molecule.]

Specifically, preferable fluorinated olefins include 2,3,3,3-tetrafluoropropene ($CF_3CF=CH_2$; boiling point: −29° C.), trans-1,3,3,3-tetrafluoropropene (trans-$CF_3CH=CHF$; boiling point: −19° C.), cis-1,3,3,3-tetrafluoropropene (cis-$CF_3CH=CHF$; boiling point: 10° C.), trans-1-chloro-3,3,3-trifluoropropene (trans-$CF_3CH=CHCl$; boiling point: 19° C.), cis-1-chloro-3,3,3-trifluoropropene (cis-$CF_3CH=CHCl$; boiling point: 39° C.), 2-chloro-3,3,3-trifluoropropene ($CF_3CCl=CH_2$; boiling point: 15° C.), trans-1,2-dichloro-3,3,3-trifluoropropene (trans-$CF_3CCl=CHCl$; boiling point: 60° C.), and cis-1,2-dichloro-3,3,3-trifluoropropene (cis-$CF_3CCl=CHCl$; boiling point: 53° C.) and the like. These compounds may be used independently or as a mixture of two or more.

2,3,3,3-tetrafluoropropene (HFO-1234yf) will be described.

<HFO-1234yf>

HFO-1234yf contains a carbon-carbon double bond in a molecule and is highly reactive with a hydroxyl radical, and therefore has a very low global warming potential (GWP) and has little load on the environment. HFO-1234yf is slightly flammable and has no toxicity. HFO-1234yf has a boiling point of −29° C. at an atmospheric pressure, an atmospheric lifetime of 11 days, and a global warming potential (GWP) of 4 (Chemical Physics Letters 2007, Vol. 439, pp. 18-22). HFO-1234yf has a critical temperature of 94.7° C. and a critical pressure of 3.38 MPa (International Journal of Refrigeration 2010, Vol. 33, pp. 474-479)

Now, trans-1,3,3,3-tetrafluoropropene (HFO-1234ze (E)) will be described.

<HFO-1234ze (E)>

HFO-1234ze (E) contains a carbon-carbon double bond in a molecule and is highly reactive with a hydroxyl radical, and therefore has a very low global warming potential (GWP) and has little load on the environment. HFO-1234ze (E) is slightly flammable or flame-resistant and has no toxicity. HFO-1234ze (E) has a boiling point of −19° C. at an atmospheric pressure, an atmospheric lifetime of 14 days, and a global warming potential (GWP) of 6 (Chemical Physics Letters 2007, Vol. 443, pp. 199-204). HFO-1234ze (E) has a critical temperature of 109.4° C. and a critical pressure of 3.63 MPa (Journal of Chemical Engineering Data 2010, Vol. 55, pp. 1594-1597).

Now, cis-1,3,3,3-tetrafluoropropene (HFO-1234ze (Z)) will be described.

<HFO-1234ze (Z)>

HFO-1234ze (Z) contains a carbon-carbon double bond in a molecule and is highly reactive with a hydroxyl radical, and therefore has a very low global warming potential (GWP) and has little load on the environment. HFO-1234ze (Z) is slightly flammable or flame-resistant and has no toxicity. HFO-1234ze (Z) has a boiling point of 9.8° C. at an atmospheric pressure, an atmospheric lifetime of 10 days, and a global warming potential (GWP) of 3 (Chemical Physics Letters 2009, Vol. 473, pp. 233-237). HFO-1234ze (Z) has a critical temperature of 150.1° C. and a critical pressure of 3.54 MPa (4th IIR Conference on Thermophysical Properties and Transfer Processes of Refrigerant, Proceedings TP-018).

Now, trans-1-chloro-3,3,3-trifluoropropene (HCFO-1233zd (E)) will be described.

<HCFO-1233zd (E)>

HCFO-1233zd (E) contains a carbon-carbon double bond in a molecule and is highly reactive with a hydroxyl radical, and therefore has a very low global warming potential (GWP) and has little load on the environment. HCFO-1233zd (E) is slightly flammable or flame-resistant and has no toxicity. HCFO-1233zd (E) has a boiling point of 18.3° C. at an atmospheric pressure, an atmospheric lifetime of 26 days, and a global warming potential (GWP) of 7 (Journal of Photochemistry and Photobiology A: Chemistry 2008, Vol. 199, pp. 92-97). HCFO-1233zd (E) has a critical temperature of 109.4° C. and a critical pressure of 3.63 MPa (Journal of Chemical Engineering Data 2012, Vol. 57, pp. 3581-3586).

These compounds are each non-flammable or slightly flammable, contain a carbon-carbon double bond in a molecule, are highly reactive with a hydroxyl radical, and have a short atmospheric lifetime, and therefore have very little influence on the global warming and thus have little load on the environment. These compounds are each contained in the heat transmission medium (100% by mass) at 50% by mass or more, preferably at 75% by mass or more, and more preferably at 90% by mass or more. In the case where such a compound is contained at less than 50% by mass, the effects of the heat transmission medium according to the present invention (stability of the heat transmission medium, heat cycle performance, etc.) are not fully provided easily, which is not preferable.

Now, 1,1,1,3,3-pentafluoropropane (HFC-245fa) will be described.

<HFC-245fa>

HFC-245fa is non-flammable and has a low level of toxicity. HFC-245fa has a boiling point of 15.3° C. at an atmospheric pressure, an atmospheric lifetime of 7.6 years, and a global warming potential (GWP) of 1030 (IPCC 4th Assessment Report, 2007).

HFC-245fa has a high global warming potential (GWP), and therefore, when being used, is contained preferably at 1% by mass or more and 20% by mass or less, and especially preferably at 1% by mass or more and 10% by mass or less.

The heat transmission medium according to the present invention may contain, in addition to the fluorinated olefin described above, any of other additive compounds such as other fluorinated olefins, fluorinated ethers, hydrochlorocarbons (HCC), hydrofluorocarbons (HFC), alcohols, saturated hydrocarbons and or the like. Hereinafter, such other additive compounds will be described in detail. Such an additive compound is preferably contained at 50% by mass or less, preferably at 25% by mass or less, and more preferably at 10% by mass or less in order not to spoil the effects of the heat transmission medium according to the present invention.

<Other Fluorinated Olefins>

Usable fluorinated olefins other than the above-described preferable fluorinated olefins include trans-1,1,1,4,4,4-hexafluoro-2-butene (trans-$CF_3CH=CHCF_3$: boiling point: 9° C.), cis-1,1,1,4,4,4-hexafluoro-2-butene (cis-$CF_3CH=CHCF_3$: boiling point: 33° C.), trans-1,1,1,3-tetrafluoro-2-butene (trans-$CF_3CH=CFCH_3$: boiling point: 17° C.), cis-1,1,1,3-tetrafluoro-2-butene (cis-$CF_3CH=CFCH_3$: boiling point: 49° C.), 1,1,2,3,3,4,4-heptafluoro-1-butene ($CHF_2CF_2CF=CF_2$; boiling point: 21° C.), 3-(trifluoromethyl)-3,4,4,4-tetrafluoro-1-butene (($CF_3$)$_2CFCH=CH_2$; boiling point: 23° C.), 2,4,4,4-tetrafluoro-1-butene ($CF_3CH_2CF=CH_2$; boiling point: 30° C.), 3,3,3-trifluoro-2-(trifluoromethyl)-1-propene (($CF_3$)$_2CH=CH_2$: boiling point: 14° C.), 1-chloro-pentafluoropropene ($CF_3CF=CFCl$; boiling point: 8° C.), 1-chloro-2-fluoropropene, 1,1-dichloro-3,3,3-trifluoropropene, 3,3-dichloro-1,1,3-trifluoropropene, 1,3-dichloro-2,3,3-trifluoropropene, 3,3-dichloro-2,3-difluoropropene, 3,3,3-trifluoropropene, 1,1,1,3,3-pentafluoropropene, 1,1,1,2,3-pentafluoropropene, 2,4,4,4-tetrafluoro-1-butene, 2,4,4,4-tetrafluoro-2-butene, 1,1,1,4,4,4-hexafluoro-2-butene, 1-chloro-1,1,4,4,4-pentafluoro-2-butene, 1,4-dichloro-1,1,4,4-tetrafluoro-2-butene, 1,1-dichloro-1,4,4-tetrafluoro-2-butene, perfluoro-(4-methyl-2-pentene), and the like. These fluorinated olefins may be used independently or as a mixture of two or more.

<Other Additive Compounds: Fluorinated Ethers>

The heat transmission medium according to the present invention may contain any of the following fluorinated ethers as an additive. Specifically, preferable fluorinated ethers include trans-1-methoxy-3,3,3-trifluoropropene ($CF_3CH=CHOCH_3$; boiling point: 62° C.), 2-methoxy-1,1,1,3,3,3-hexafluoropropane ($CF_3$)$_2CHOCH_3$; boiling point: 50° C.), 1,1,2,2-tetrafluoro-1-methoxyethane ($CF_2HCF_2OCH_3$; boiling point: 37° C.), 1,1,2,2-tetrafluoroethyl-2,2,2-trifluoroethylether ($CF_2HCF_2OCH_2CF_3$; boiling point: 56° C.), 2,2,2-trifluoroethyltrifluoromethylether ($CF_3CH_2OCF_3$; boiling point: 6° C.), 3H-hexafluoropropyltrifluoromethylether ($CHF_2CF_2CF_2OCF_3$; boiling point: 23-34° C.), 2,2,3,3,3-pentafluoropropyltrifluoromethylether ($CF_3CF_2CH_2OCF_3$; boiling point: 26° C.), heptafluoro-1-methoxypropane ($CF_3CF_2CF_2OCH_3$; boiling point: 34° C.), heptafluoropropyl-1,1,2,2-tetrafluoroethylether ($CF_3CF_2CF_2OCHFCF_3$; boiling point: 41° C.), difluoromethyl-2,2,3,3,3-pentafluoropropylether ($CF_3CF_2CF_2OCHF_2$; boiling point: 46° C.), 1,1,2,3,3,3-hexafluoropropyl-difluoromethylether ($CF_3CHFCF_2OCHF_2$; boiling point: 47° C.), 1,2-dichlorotrifluoroethyltrifluoromethylether ($CF_2ClCFClOCF_3$; boiling point: 41° C.), octafluoro-3-methoxypropene ($CF_2=CFCF_2OCF_3$; boiling point: 10° C.), 2-(methoxymethyl)-1,1,1,3,3,3-hexafluoropropane, 2-(methoxydifluoromethyl)-1,1,1,3,3,3-hexafluoropropane, bisdifluoromethylether, methylpentafluoroethylether, 1,2,2,2-tetrafluoroethyltrifluoromethylether, 2,2,2-trifluoroethyltrifluoromethylether, difluoromethyl-1,2,2,2-tetrafluoroethylether, difluoromethyl-2,2,2-trifluoroethylether, 1-trifluoromethyl-2,2,2-trifluoroethylmethylether, 1-trifluoromethyl-1,2,2,2-tetrafluoroethylmethylether, and 1,1,1,2,2,3,3-heptafluoro-3-methoxypropane. These compounds may be used independently or as a mixture of two or more.

<Other Additive Compounds: Hydrochlorocarbons>

Usable hydrochlorocarbons include methylene chloride, trichloroethylene, tetrachloroethylene, and the like.

<Other Additive Compounds: Hydrofluorocarbons>

Usable hydrofluorocarbons include difluoromethane (HFC-32), 1,1,1,2,2-pentafluoroethane (HFC-125), fluoroethane (HFC-161), 1,1,2,2-tetrafluoroethane (HFC-134), 1,1,1,2-tetrafluoroethane (HFC-134a), 1,1,1-trifluoroethane (HFC-143a), difluoroethane (HFC-152a), 1,1,1,2,3,3,3-heptafluoropropane (HFC-227ea), 1,1,1,2,3-pentafluoropropane (HFC-236ea), 1,1,1,3,3,3-hexafluoropropane (HFC-236fa), 1,1,1,3,3-pentafluoropropane (HFC-245fa), 1,1,1,2,3-pentafluoropropane (HFC-245eb), 1,1,2,2,3-pentafluoropropane (HFC-245ca), 1,1,1,3,3-pentafluorobutane (HFC-365mfc), 1,1,1,3,3,3-hexafluoroisobutane (HFC-356mmz), 1,1,1,2,2,3,4,5,5,5-decafluoropentane (HFC-43-10-mee), and the like.

<Other Additive Compounds: Alcohols>

Other usable compounds include alcohols having a carbon number of 1 to 4, such as methanol, ethanol, n-propanol, i-propanol, n-butanol, i-butanol, 2,2,2-trifluoroethanol, pentafluoropropanol, tetrafluoropropanol, 1,1,1,3,3,3-hexafluoro-2-propanol, and the like.

<Other Additive Compounds: Saturated Hydrocarbons>

Other usable compounds include saturated hydrocarbons having a carbon number of 3 or more and 8 or less, such as propane, n-butane, i-butane, neopentane, n-pentane, i-pentane, cyclopentane, methylcyclopentane, n-hexane, cyclohexane, and the like. At least one compound selected from these saturated hydrocarbons may be contained. Especially preferable among these substances may be neopentane, n-pentane, i-pentane, cyclopentane, methylcyclopentane, n-hexane, and cyclohexane. These saturated hydrocarbons have a low global warming potential, and when being added to the specific fluorinated olefin according to the present invention, may further decrease the global warming potential of the fluorinated olefin. These saturated hydrocarbons cost low and are easily available, and thus may also decrease the cost of the heat transmission medium according to the present invention.

<Other Additive Compounds>

Other usable additive compounds include water, carbon dioxide, ammonia, and dimethylether (DME).

<Lubricant>

In the case where the heat transmission medium according to the present invention is used as a coolant of a high-temperature heat pump, a lubricant is used in a compressor sliding portion. Examples of the lubricant include mineral oil (paraffin-based oil or naphthene-based oil), and synthetic oils such as alkylbenzenes (AB), poly(alfa-olefin), esters, polyolesters (POE), polyalkyleneglycols (PAG), and polyvinylethers (PVE).

In the case where the heat transmission medium according to the present invention is used as a working medium of a rankine cycle, a lubricant is used in an expander sliding portion. Examples of the lubricant include mineral oil (paraffin-based oil or naphthene-based oil), and synthetic oils such as alkylbenzenes (AB), poly(alfa-olefin), esters, polyolesters (POE), polyalkyleneglycols (PAG), and polyvinylethers (PVE).

Usable alkylbenzenes include n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

Usable esters include aromatic esters such as benzoic acid, phthalic acid, isophthalic acid, terephthalic acid, trimellitic acid, pyromellitic acid, a mixture thereof and the like; dibasic acid ester; polyolester; complex ester; carbonate ester; and the like.

Alcohols which are materials of polyolesters include, for example, esters of hindered alcohol such as neopentylglycol, trimethylolethane, trimethylolpropane, trimethylolbutane, di-(trimethylolpropane), tri-(trimethylolpropane), pentaerythritol, di-(pentaerythritol), tri-(pentaerythritol), and the like.

Carboxylic acids which are materials of polyolesters include valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid, 3,5,5-trimethylhexanoic acid, and the like.

A usable example of polyalkyleneglycol is a compound obtained by addition polymerization of aliphatic alcohol having a carbon number of 1 or more and 18 or less, such as methanol, ethanol, linear or branched propanol, linear or branched butanol, linear or branched pentanol, linear or branched hexanol or the like, with ethylene oxide, propylene oxide, butylene oxide or the like.

Usable polyvinylethers include polymethylvinylether, polyethylvinylether, poly-n-propylvinylether, polyisopropylvinylether, and the like.

<Stabilizer>

The heat transmission medium according to the present invention may contain a stabilizer in order to improve the thermal stability, oxidation resistance and the like thereof. Examples of the stabilizer include nitro compounds, epoxy compounds, phenols, imidazoles, amines, hydrocarbons, and the like.

Usable nitro compounds include known compounds, for example, aliphatic and/or aromatic derivatives. Usable aliphatic nitro compounds include, for example, nitromethane, nitroethane, 1-nitropropane, 2-nitropropane, and the like. Usable aromatic nitro compounds include, for example, nitrobenzene, o-, m- or p-dinitrobenzene, trinitrobenzene, o-, m- or p-nitrotoluene, o-, m- or p-ethylnitrobenzene, 2,3-, 2,4-, 2,5-, 2,6-, 3,4- or 3,5-dimethylnitrobenzene, o-, m- or p-nitroacetophenone, o-, m- or p-nitrophenol, o-, m- or p-nitroanisole, and the like.

Usable epoxy compounds include, for example, monoepoxy-based compounds such as ethyleneoxide, 1,2-butyleneoxide, propyleneoxide, styreneoxide, cyclohexeneoxide, glycidol, epichlorhydrin, glycidylmethacrylate, phenylglycidylether, allylglycidylether, methylglycidylether, butylglycidylether, 2-ethylhexylglycidylether, and the like; and polyepoxy-based compounds such as diepoxybutane, vinylcyclohexenedioxide, neopentylglycoldiglycidylether, ethyleneglycoldiglycidylether, glycerinepolyglycidylether, trimethylolpropanetriglycidylether, and the like.

Usable phenols may contain any of various substitutes such as an alkyl group, an alkenyl group, an alkoxy group, a carboxyl group, a carbonyl group, a halogen atom or the like as well as a hydroxy group. Such phenols include, for example, monovalent phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, xylenol, and the like; and divalent phenols such as t-butylcatechol, 2,5-di-t-aminohydroquinone, 2,5-di-t-butylhydroquinone, and the like.

Usable imidazoles contain, as a substitute at the N position, a linear or branched alkyl group, a linear or branched cycloalkyl group or a linear or branched aryl group having a carbon number of 1 or more and 18 or less. Such imidazoles include 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like. These compounds may be used independently or in a combination of two or more.

Usable amines include pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine, dipropylamine, butylamine, isobutylamine, dibutylamine, tributylamine, dipentylamine, tripentylamine, 2-ethylhexylamine, aniline, N, N-dimethylaniline, N, N-diethylaniline, ethylenediamine, propylenediamine, diethylenetriamine, tetraethylenepentamine, benzylamine, dibenzylamine, diphenylamine, diethylhydroxylamine, and the like. These may be used independently or in a combination of two or more.

Usable hydrocarbons include aromatic unsaturated hydrocarbons such as α-methylstyrene, p-isopropenyltoluene, and the like; isoprenes; propadienes; terpenes; and the like. These may be used independently or in a combination of two or more.

The stabilizer may be added to one of, or both of, the coolant and the lubricant in advance, or may be put into the condenser independently. There is no specific limitation on the amount of the stabilizer, but the amount of the stabilizer is preferably 0.001% by mass or more and 10% by mass or less, more preferably 0.01% by mass or more and 5% by mass or less, and still more preferably 0.02% by mass or more and 2% by mass or less, with respect to the main heat transmission medium (100% by mass). In the case where the amount of the stabilizer exceeds the upper limit or less than the lower limit, the stability of the coolant, the heat cycle performance and the like are not provided sufficiently.

<Flame Retardant>

The heat transmission medium according to the present invention may contain a flame retardant in order to improve the flammability thereof. Examples of the flame retardant include phosphates, halogenated aromatic compounds, fluorinated iodocarbon, fluorinated bromocarbon, and the like.

The condensation pressure of the heat transmission medium according to the present invention having such a composition is determined by the composition and the condensation temperature of the heat transmission medium. Namely, the condensation pressure is equal to the saturated steam pressure of the heat transmission medium at the condensation temperature. In general, when the condensation pressure of a coolant exceeds 5.0 MPa, the compressor, the condenser and pipes need to have a high level of pressure resistance. This is not preferable because the devices having such a high level of pressure resistance cost high. In the case where the heat transmission medium according to the present invention is used, the condensation pressure is lower than 5.0 MPa, and thus a known compressor, a known condenser and known pipes are usable.

The heat transmission medium according to the present invention is non-flammable, has little load on the environment, and has superb heat cycle characteristics. Therefore, the heat transmission medium according to the present invention is usable as a heat transmission medium for a high-temperature heat pump usable to generate pressurized hot water, superheated steam or the like; as a working medium for an organic rankine cycle usable for a power generation system or the like; as a coolant for a steam compression-type freezing cycle system; as a medium for an absorption-type heat pump, a heat pipe or the like; a washing detergent for cycle washing of a cooling system or a heat pump system; as a metal washing detergent; as a flux washing detergent; as a dilution solvent; as a foaming agent, as an aerosol; or the like.

The heat transmission medium according to the present invention is applicable for a packaged compact device (rankine cycle system, heat pump cycle system, etc.) and also for a power general system, a heat pump hot water supply system, a heat pump steam generation system or the like of a large plant scale.

Hereinafter, a high-temperature heat pump system using the heat transmission medium according to the present invention will be described in detail.

<High-Temperature Heat Pump Device>

A high-temperature heat pump device is a system that transfers heat of a substance to be cooled, for example, air, water, brine or the like, to a coolant (heat transmission medium), by an evaporator, as latent heat of evaporation of the coolant, applies work to, and thus compress, the generated coolant steam by the compressor, discharges the heat of condensation by the condenser to liquefy the coolant steam, subjects the condensed coolant to throttle expansion by an expansion valve so that the condensed coolant has a low pressure and a low temperature, and transfers the coolant to the evaporator to evaporate the coolant. In the evaporator, the coolant receives the thermal energy of the substance to be cooled, so that the substance to be cooled is cooled to decrease the temperature. In the condenser, the thermal energy of the coolant is given to a load fluid, so that the load fluid is heated to increase the temperature. The high-temperature heat pump device is applicable to a known system.

In the high-temperature heat pump device, the coolant may be compressed into a state of having a temperature higher than the critical temperature and a pressure higher than the critical pressure. This cycle is called a "transcritical cycle". In the transcritical cycle, the coolant is not phase-changed (condensed) in a step of giving the thermal energy to the load fluid. A heat exchanger corresponding to the condenser is called a "gas cooler".

A fluid to be cooled or a fluid to be heated that is subjected to heat exchange with a working medium (heat transmission medium) in a heat exchanger of the high-temperature heat pump device may be air, water, brine, silicone oil, or the like. One of such mediums is preferably selected in accordance with the temperature condition of cycle driving.

FIG. 1 is a schematic view showing an example of a high-temperature heat pump device to which the heat transmission medium according to the present invention is applicable. Hereinafter, a structure and an operation (repetition cycle) of a high-temperature heat pump device 100 shown in FIG. 1 will be described.

The high-temperature heat pump device 100 according to the present invention includes an evaporator 11 that receives heat and a condenser 13 that supplies heat. The high-temperature heat pump device 100 also includes a compressor 12 that increases the pressure of a working medium steam that has exited from the evaporator 11 to consume electric power, and an expansion valve 14 that subjects the working medium supercooled liquid that has exited from the gas cooler 13 to throttle expansion.

In the case where the steam compression cycle is repeated using the heat transmission medium according to the present invention as a working medium, (A) through (D) below may be performed to obtain, as thermal energy, energy that is greater than the electric power put to the medium to be heated, by the gas cooler.

(A) The working medium in a liquid state in the heat exchanger (evaporator 11) is subjected to heat exchange with a fluid to be cooled (air, water, etc.), so that the working medium is gasified.

(B) The gasified working medium is removed from the heat exchanger 11 and is transferred to the compressor 12, so that the working medium is supplied in a supercritical state of a temperature higher than the critical temperature of the working medium and a pressure higher than the critical pressure of the working medium.

(C) The working medium in the supercritical state that has exited from the compressor 12 is transferred to the gas cooler 13 and is subjected to heat exchange with a fluid to be heated (air, water, etc.), so that the working medium is liquefied.

(D) The liquefied working medium is subjected to throttle expansion by the expansion valve 14, and a low-pressure wet steam is supplied, so that the working medium is recirculated to step (A).

The heat transmission medium according to the present invention is used as the working medium of the steam compression cycle system to generate pressurized hot water or superheated steam having a temperature of 80° C. or higher, preferably of 100° C. or higher, more preferably of 130° C. or higher, still more preferably of 150° C. or higher, and most preferably 170° C. or higher. In the case where warm water or pressurized hot water of about 80° C. to about 100° C. is to be generated, the heat transmission medium to be used is especially preferably 2,3,3,3-tetrafluoropropene (HFO-1234yf) or a composition containing HFO-1234yf as a main component. In the case where pressurized hot water or superheated water vapor having a temperature of about 100° C. to about 130° C. is to be generated, the heat transmission medium to be used is especially preferably trans-1,3,3,3-tetrafluoropropene (HFO-1234ze (E)) or a composition containing HFO-1234ze (E) as a main component.

In the case where pressurized hot water or superheated water vapor of about 130° C. to about 150° C. is to be generated, the heat transmission medium to be used is especially preferably a mixed composition of cis-1,3,3,3-tetrafluoropropene (HFO-1234ze (Z)) and trans-1,3,3,3-tetrafluoropropene (HFO-1234ze (E)) or a mixed composition of cis-1,3,3,3-tetrafluoropropene (HFO-1234ze (Z)) and 2,3,3,3-tetrafluoropropene (HFO-1234yf). In the case where pressurized hot water or superheated water vapor of about 150° C. to about 170° C. is to be generated, the heat transmission medium to be used is especially preferably cis-1,3,3,3-tetrafluoropropene (HFO-1234ze (Z)) or a composition containing HFO-1234ze (Z) as a main component. In the case where pressurized hot water or superheated water vapor of 170° C. or higher is to be generated, the heat transmission medium to be used is especially preferably trans-1-chloro-3,3,3-trifluoropropene (HCFO-1233zd (E)) or a composition containing HCFO-1233zd (E) as a main component.

In the case where the heat transmission medium according to the present invention is 2,3,3,3-tetrafluoropropene (HFO-1234yf), in a supercritical state of HFO-1234fy generated in a step of compressing the heat transmission medium into the supercritical state, the temperature is 94.7° C. or higher and 200° C. or lower and the pressure is 3.38 MPa or higher and 5.0 MPa or lower.

In the case where the heat transmission medium according to the present invention is trans-1,3,3,3-tetrafluoropropene (HFO-1234ze (E)), in a supercritical state of HFO-1234ze (E) generated in a step of compressing the heat transmission medium into the supercritical state, the temperature is 109.4° C. or higher and 200° C. or lower and the pressure is 3.63 MPa or higher and 5.0 MPa or lower.

In the case where the heat transmission medium according to the present invention is cis-1,3,3,3-tetrafluoropropene (HFO-1234ze (Z)), in a supercritical state of HFO-1234ze (Z) generated in a step of compressing the heat transmission medium into the supercritical state, the temperature is 150.1° C. or higher and 250° C. or lower and the pressure is 3.54 MPa or higher and 5.0 MPa or lower.

In the case where the heat transmission medium according to the present invention is trans-1-chloro-3,3,3-trifluoropropene (HCFO-1233zd (E)), in a supercritical state of HCFO-1233zd (E) generated in a step of compressing the heat transmission medium into the supercritical state, the temperature is 165.6° C. or higher and 250° C. or lower and the pressure is 3.77 MPa or higher and 5.0 MPa or lower.

EXAMPLES

Hereinafter, the present invention will be described in detail by way of examples. The present invention is not limited to any of the following examples.

The coefficient of performance (COP) is a generally recognized criterion for performance of a coolant, and is especially useful to represent a relative thermodynamic efficiency of a heat transmission medium in a specific heating or cooling cycle including evaporation or condensation of the heat transmission medium. The ratio of the amount of heat received by the heat transmission medium from a medium to which heat is to be transmitted in an evaporator, with respect to the work applied by a compressor for compression, is represented by $COP_R$. By contrast, the ratio of the amount of heat released by the heat transmission medium to the medium to which heat is to be transmitted in a condenser, with respect to the work applied by the compressor for compressing the steam, is represented by $COP_H$. In the examples, in the case of a transcritical cycle that does not include a condensation step, the ratio of the amount of heat released by the coolant to the medium to which heat is to be transmitted in the gas cooler, with respect to the work applied by the compressor for compressing the steam, is represented by $COP_H$.

The volume capacity of a heat transmission medium represents the amount of heat for cooling or heating that is given by the heat transmission medium per unit absorption volume of a compressor. Namely, as the volume capacity of the heat transmission medium is larger with respect to a specific compressor, the heat transmission medium absorbs or releases a larger amount of heat.

Example 1

2,3,3,3-tetrafluoropropene: HFO-1234yf

In a performance evaluation on a high-temperature heat pump cycle using 2,3,3,3-tetrafluoropropene as a heat transmission medium, the coefficient of performance was calculated under the conditions shown in Table 1. Physical property values of the heat transmission medium were obtained from REFPROP ver. 9.0 of National Institute of Standards and Technology (NIST) of the United States, or were found by a physical property prediction method.

Table 1 shows transcritical high-temperature heat pump cycle calculation conditions 1.

TABLE 1

| Transcritical high-temperature heat pump cycle calculation conditions 1 | | | |
|---|---|---|---|
| Evaporation temperature | $T_{EVA}$ | 80 | [° C.] |
| Degree of superheat | $T_{sh}$ | 5 | [K] |
| Temperature at the compressor outlet (at the time of isentropic compression | $T_{2th}$ | 120 | [° C.] |
| Temperature at the gas cooler outlet | $T_{GCout}$ | 95 | [° C.] |
| Compressor efficiency | $\eta$ | 0.7 | [—] |

The heat pump cycle conditions 1 are made with an assumption that pressurized hot water of 110° C. is generated by heat exchange with heat source water in the gas cooler.

For calculating the high-temperature heat pump cycle performance ($COP_H$), the following conditions were assumed.

(A) The compression performed by the compressor is isentropic compression.

(B) The throttle expansion performed by the expansion valve is isenthalpic expansion.

(C) The heat loss and the pressure loss in the pipe and the heat exchanger are ignored.

(D) The compressor efficiency $\eta$ is 0.7.

Hereinafter, equations used to calculate the high-temperature heat pump cycle performance ($COP_H$) will be described in detail. The input heat amount $Q_{EVA}$ to the evaporator is:

$$Q_{EVA} = G \times (h_1 - h_4) \quad (1)$$

The released heat amount $Q_{GC}$ from the gas cooler is:

$$Q_{GC} = G \times (h_2 - h_3) \quad (2)$$

It should be noted that where the enthalpy of the heat transmission medium at the outlet of the compressor after the isentropic compression is represented by $h_{2th}$, enthalpy $h_2$ of the heat transmission medium at the outlet of the compressor calculated in consideration of the compressor efficiency is:

$$h_2 = h_1 + (h_{2th} - h_1) / \eta \quad (3)$$

Work volume W given by the compressor for compressing the heat transmission medium steam is:

$$W = G \times (h_2 - h_1) \quad (4)$$

The coefficient of performance ($COP_H$) of the high-temperature heat pump cycle is:

$$COP_H = Q_{GC} / W = (h_2 - h_3) / (h_2 - h_1) \quad (5)$$

Now, an equation used to calculate the volume capability (CAP) of the heat transmission medium will be described in detail. The steam density of the heat transmission medium at the absorption inlet of the compressor is $\rho_2$, and the amount of heat released from the gas cooler is $Q_{GC}$. Therefore, $$CAP = \rho_2 \times Q_{GC} = \rho_2 \times G \times (h_2 - h_3) \quad (6)$$

In (1) through (6) above, the symbols represent the following:

G: Amount of circulating heat transmission medium

Figure 2:
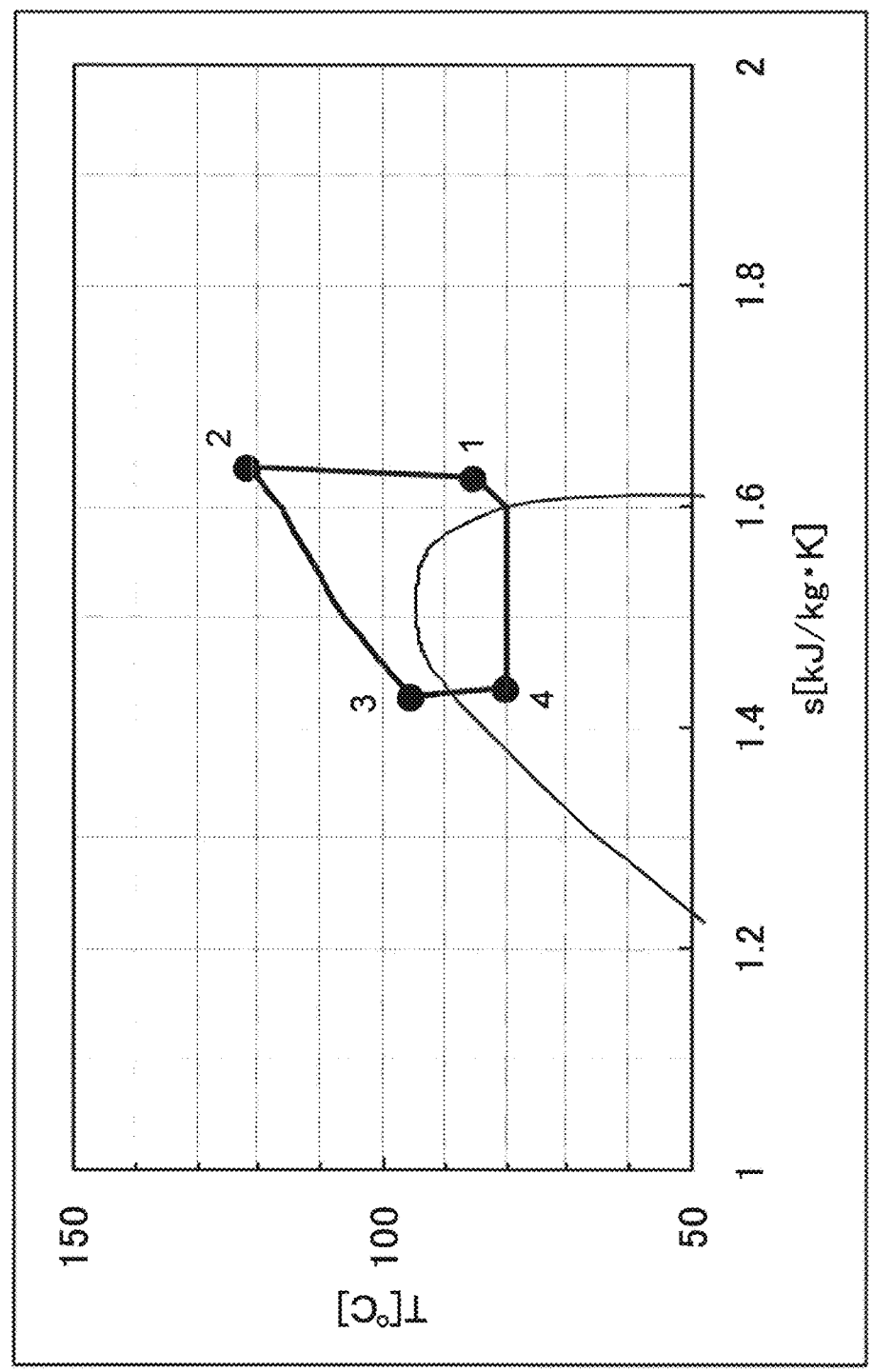
FIG. 2 is a T-s diagram in example 1 according to the present invention.

W: Compression work $Q_{EVA}$: Input heat amount
$Q_{GC}$: Released heat amount
$COP_H$: Coefficient of performance (heating)
CAP: Volume capacity (heating)
h: Specific enthalpy
$_{1,2,3,4}$: Cycle point
$_{2th}$: Cycle point after isentropic compression FIG. 2 is a T-s diagram in example 1. In FIG. 2, cycle points 1, 2, 3 and 4 represent the steam compression cycle calculation conditions 1.

Example 2

Trans-1,3,3,3-tetrafluoropropene: HFO-1234ze (E)

Figure 3:
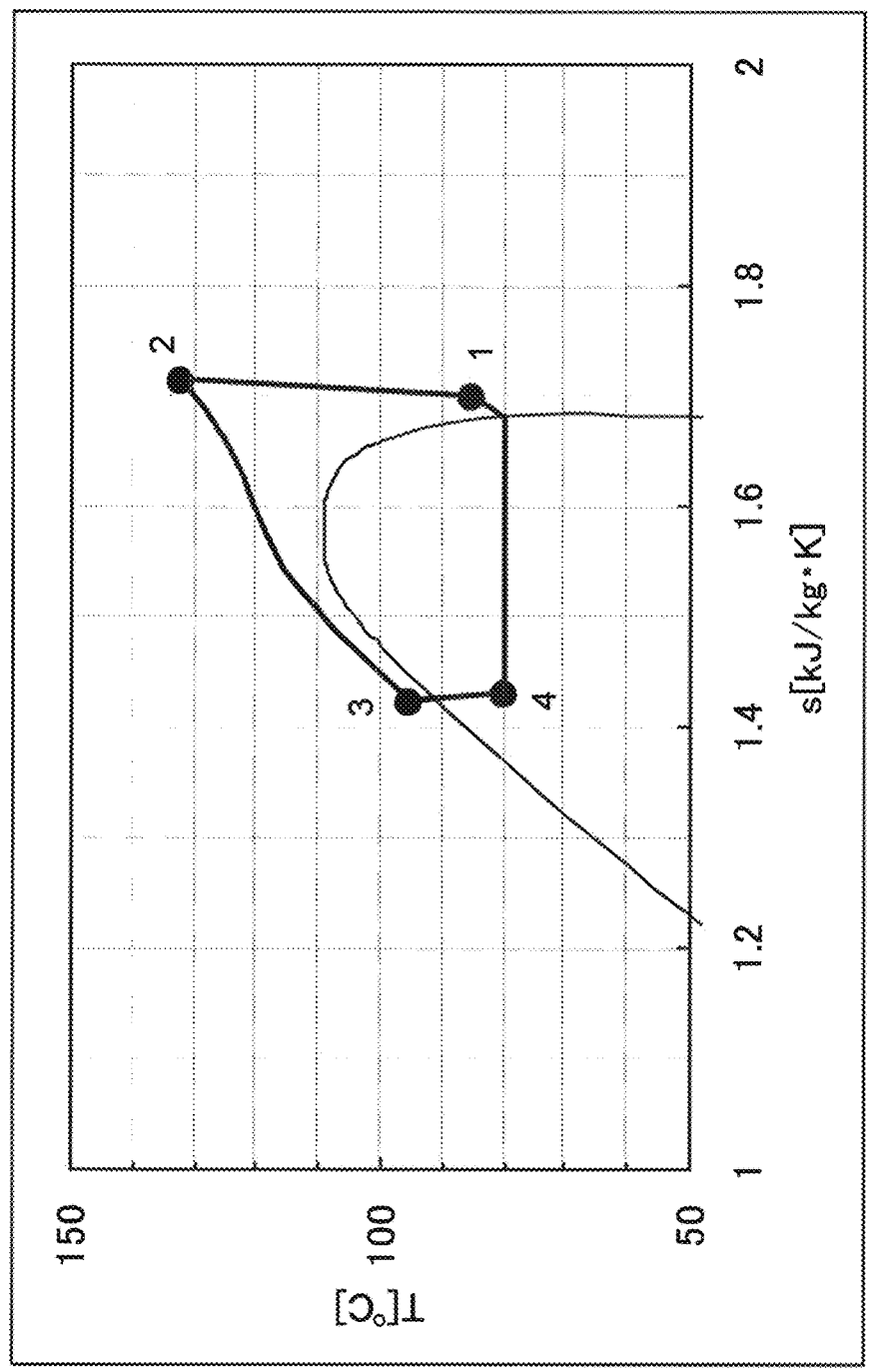
FIG. 3 is a T-s diagram in example 2 according to the present invention.

In a performance evaluation on a high-temperature heat pump cycle using trans-1,3,3,3-tetrafluoropropene as a heat transmission medium, the coefficient of performance was calculated under the conditions shown in Table 2. FIG. 3 is a T-s diagram in example 2.

Table 2 shows transcritical high-temperature heat pump cycle calculation conditions 2.

TABLE 2

| Transcritical high-temperature heat pump cycle calculation conditions 2 | | |
|---|---|---|
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 130 [° C.] |
| Temperature at the gas cooler outlet | $T_{GCout}$ | 95 [° C.] |
| Compressor efficiency | η | 0.7 [—] |

The heat pump cycle conditions 2 are made with an assumption that pressurized hot water of 120° C. is generated by heat exchange with heat source water in the gas cooler.

Example 3

Cis-1,3,3,3-tetrafluoropropene: HFO-1234ze (Z)

Figure 4:
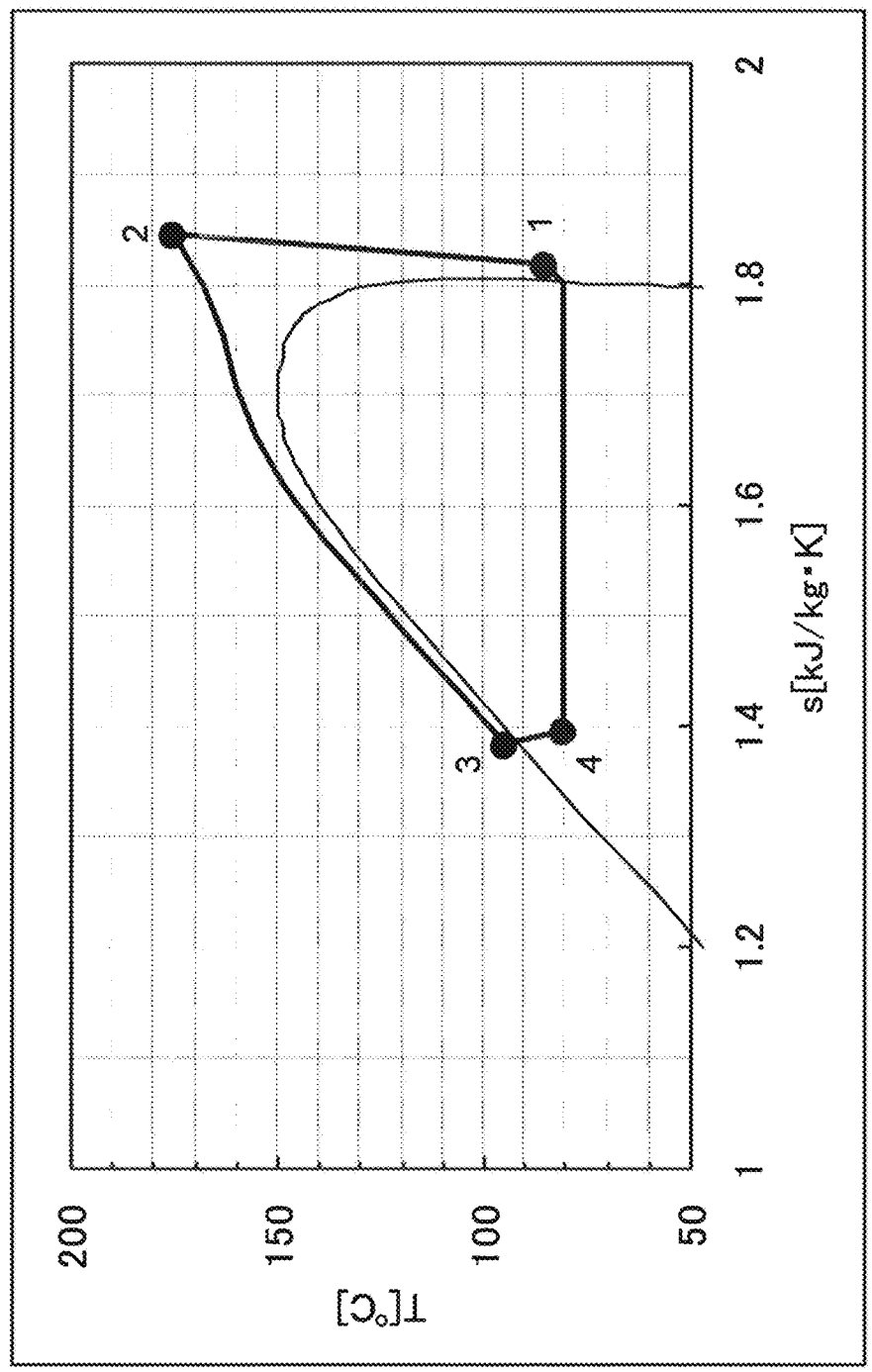
FIG. 4 is a T-s diagram in example 3 according to the present invention.

In a performance evaluation on a high-temperature heat pump cycle using cis-1,3,3,3-tetrafluoropropene as a heat transmission medium, the coefficient of performance was calculated under the conditions shown in Table 3. FIG. 4 is a T-s diagram in example 3.

Table 3 shows transcritical high-temperature heat pump cycle calculation conditions 3.

TABLE 3

| Transcritical high-temperature heat pump cycle calculation conditions 3 | | |
|---|---|---|
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 170 [° C.] |
| Temperature at the gas cooler outlet | $T_{GCout}$ | 95 [° C.] |
| Compressor efficiency | η | 0.7 [—] |

The heat pump cycle conditions 3 are made with an assumption that pressurized hot water of 160° C. is generated by heat exchange with heat source water in the gas cooler.

Example 4

Trans-1-chloro-3,3,3-trifluoropropene: HCFO-1233zd (E)

Figure 5:
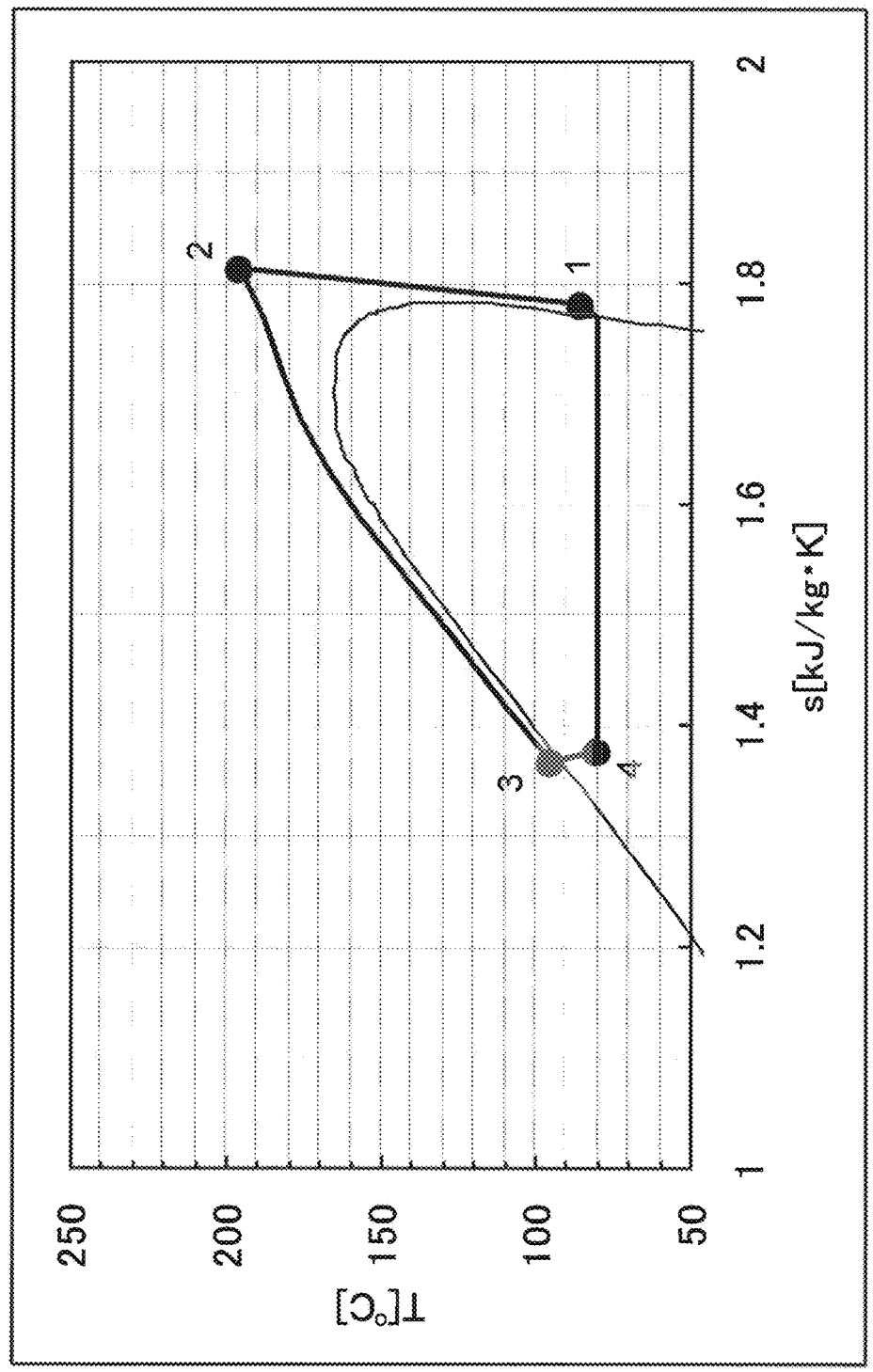
FIG. 5 is a T-s diagram in example 4 according to the present invention.

In a performance evaluation on a high-temperature heat pump cycle using trans-1-chloro-3,3,3-trifluoropropene as a heat transmission medium, the coefficient of performance was calculated under the conditions shown in Table 4. FIG. 5 is a T-s diagram in example 4.

Table 4 shows transcritical high-temperature heat pump cycle calculation conditions 4.

TABLE 4

| Transcritical high-temperature heat pump cycle calculation conditions 4 | | |
|---|---|---|
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 190 [° C.] |
| Temperature at the gas cooler outlet | $T_{GCout}$ | 95 [° C.] |
| Compressor efficiency | η | 0.7 [—] |

The heat pump cycle conditions 4 are made with an assumption that pressurized hot water of 180° C. is generated by heat exchange with heat source water in the gas cooler.

Comparative Example 1

Figure 6:
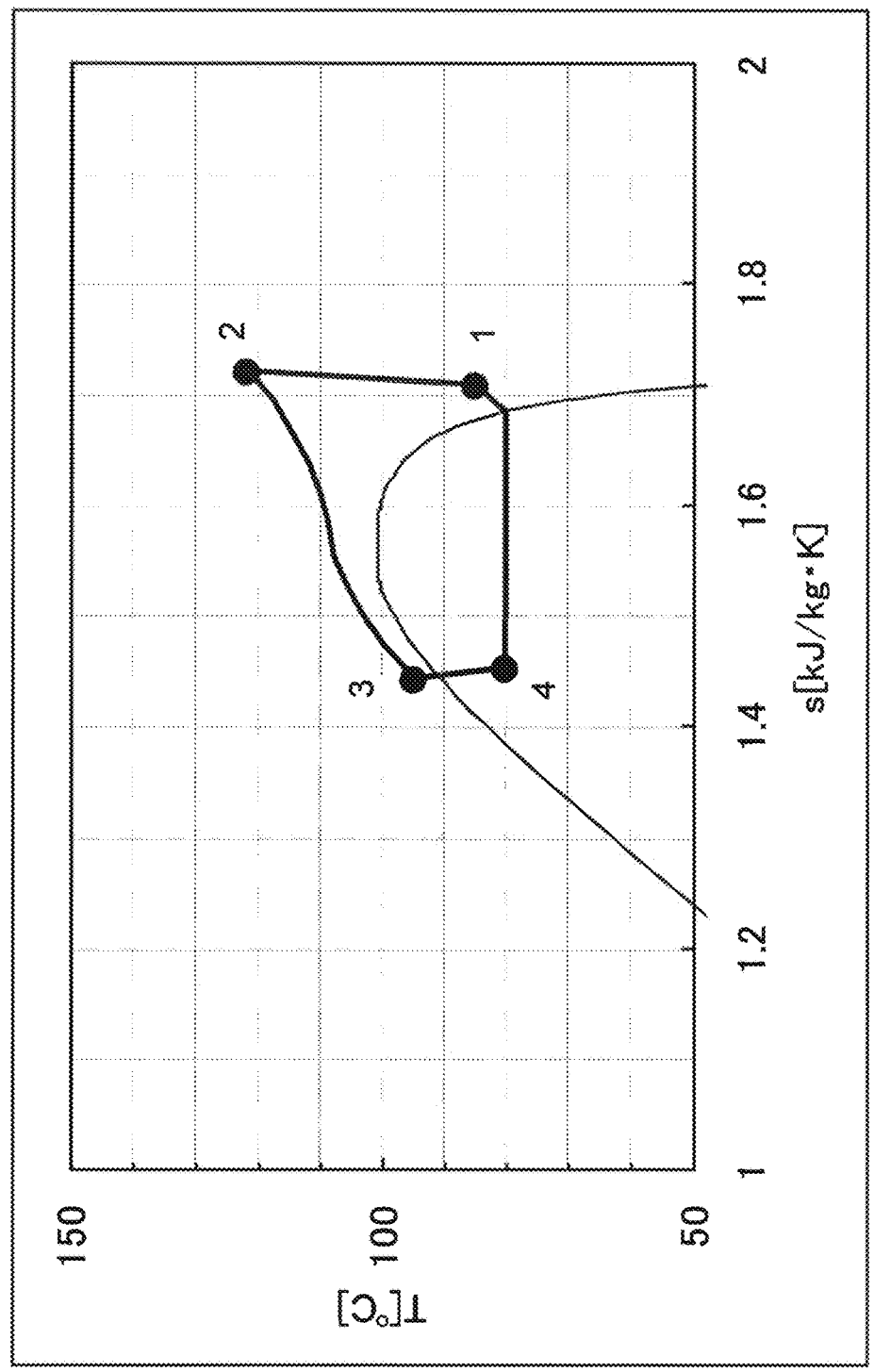
FIG. 6 is a T-s diagram in comparative example 1 provided as a comparison to the present invention.

1,1,1,2-tetrafluoroethane: HFC-134a 1,1,1,2-tetrafluoroethane was used instead of 2,3,3,3-tetrafluoropropene, and the steam compression cycle performance ($COP_H$) was evaluated under the calculation conditions 1. FIG. 6 is a T-s diagram in comparative example 1.

Comparative Example 2

Figure 7:
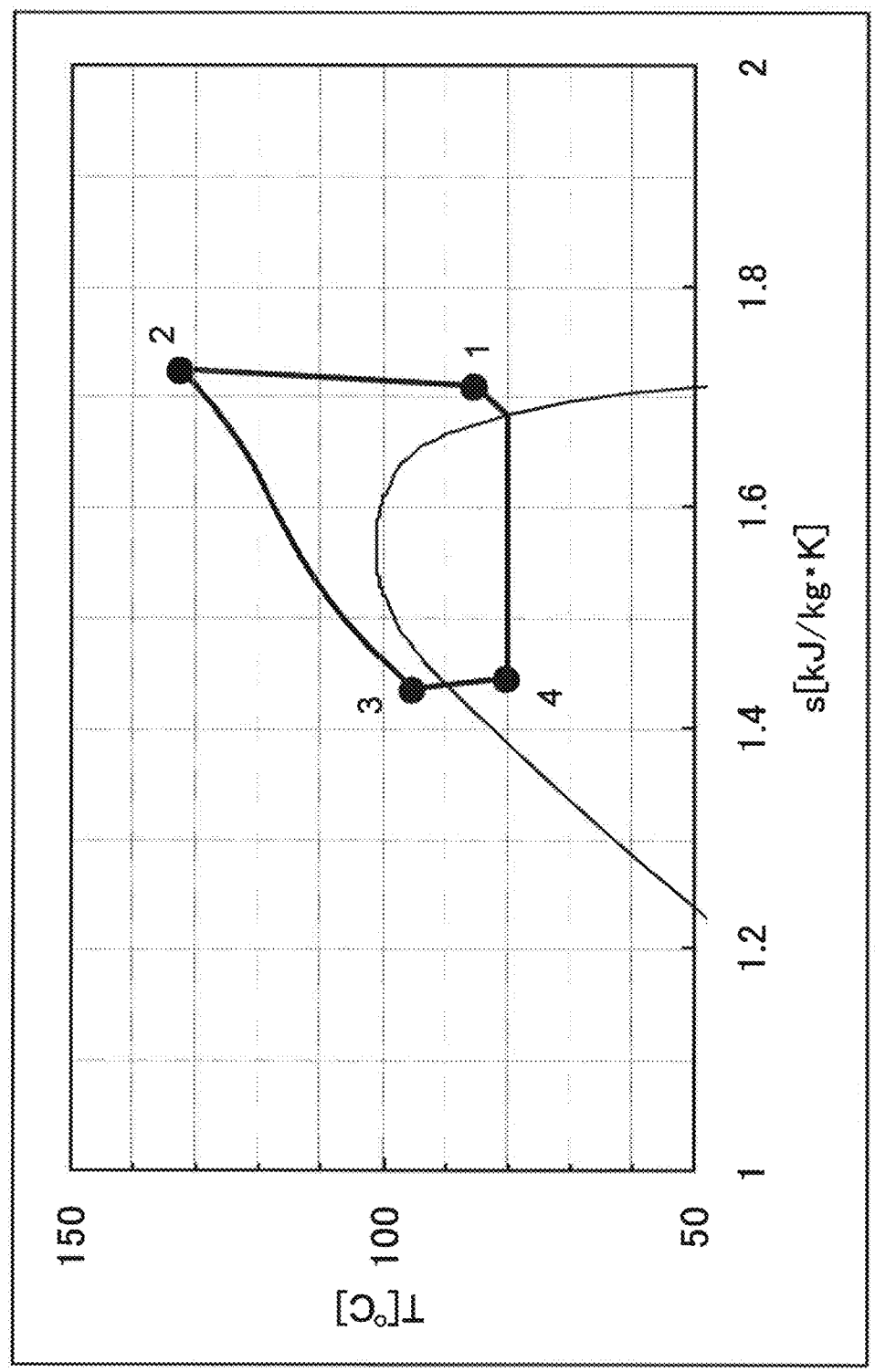
FIG. 7 is a T-s diagram in comparative example 2 provided as a comparison to the present invention.

1,1,1,2-tetrafluoroethane: HFC-134a 1,1,1,2-tetrafluoroethane was used instead of trans-1,3,3,3-tetrafluoropropene, and the steam compression cycle performance ($COP_H$) was evaluated under the calculation conditions 2. FIG. 7 is a T-s diagram in comparative example 2.

Comparative Example 3

Figure 8:
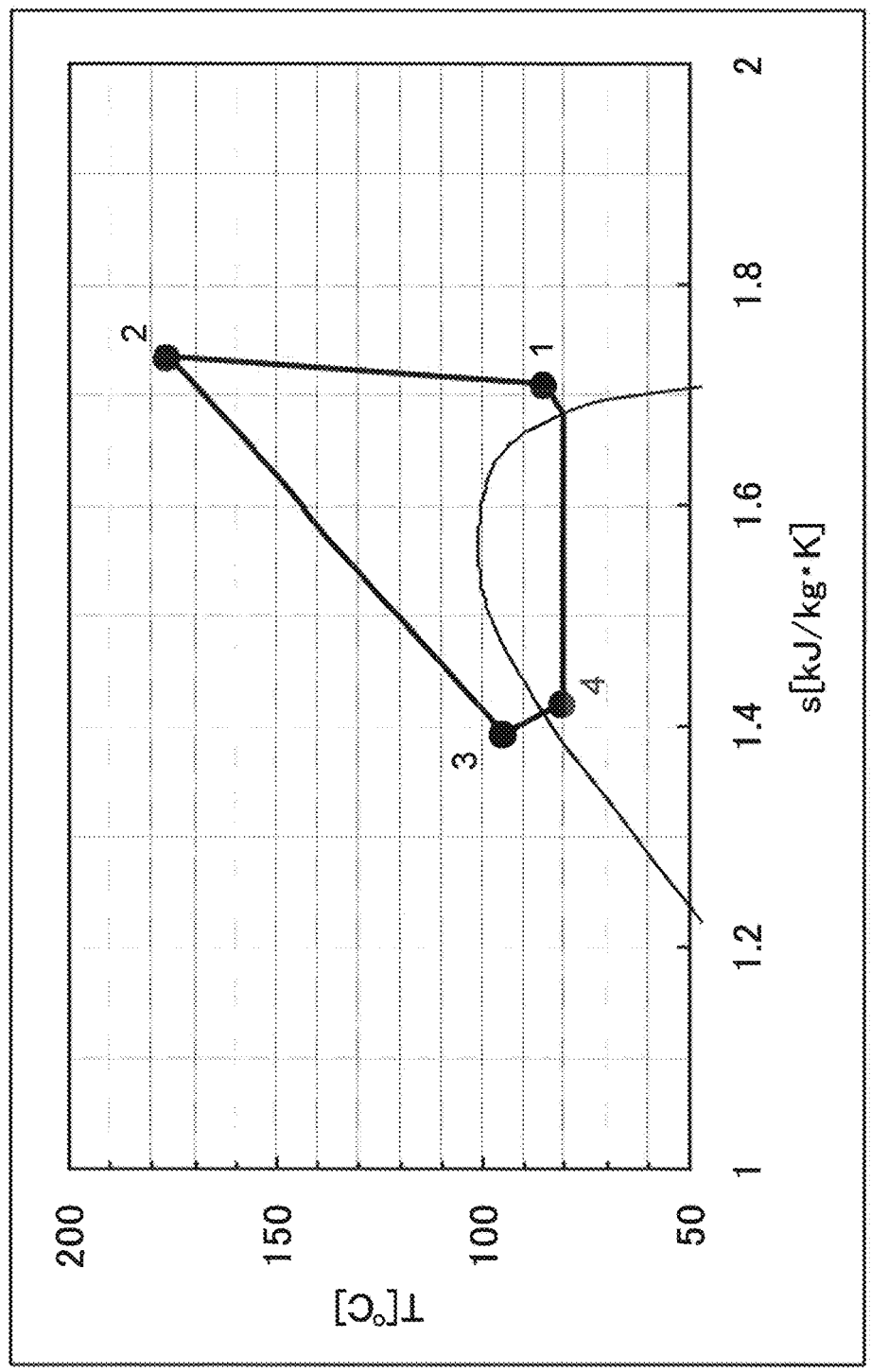
FIG. 8 is a T-s diagram in comparative example 3 provided as a comparison to the present invention.

1,1,1,2-tetrafluoroethane: HFC-134a 1,1,1,2-tetrafluoroethane was used instead of cis-1,3,3,3-tetrafluoropropene, and the steam compression cycle performance ($COP_H$) was evaluated under the calculation conditions 3. FIG. 8 is a T-s diagram in comparative example 3.

Comparative Example 4

Figure 9:
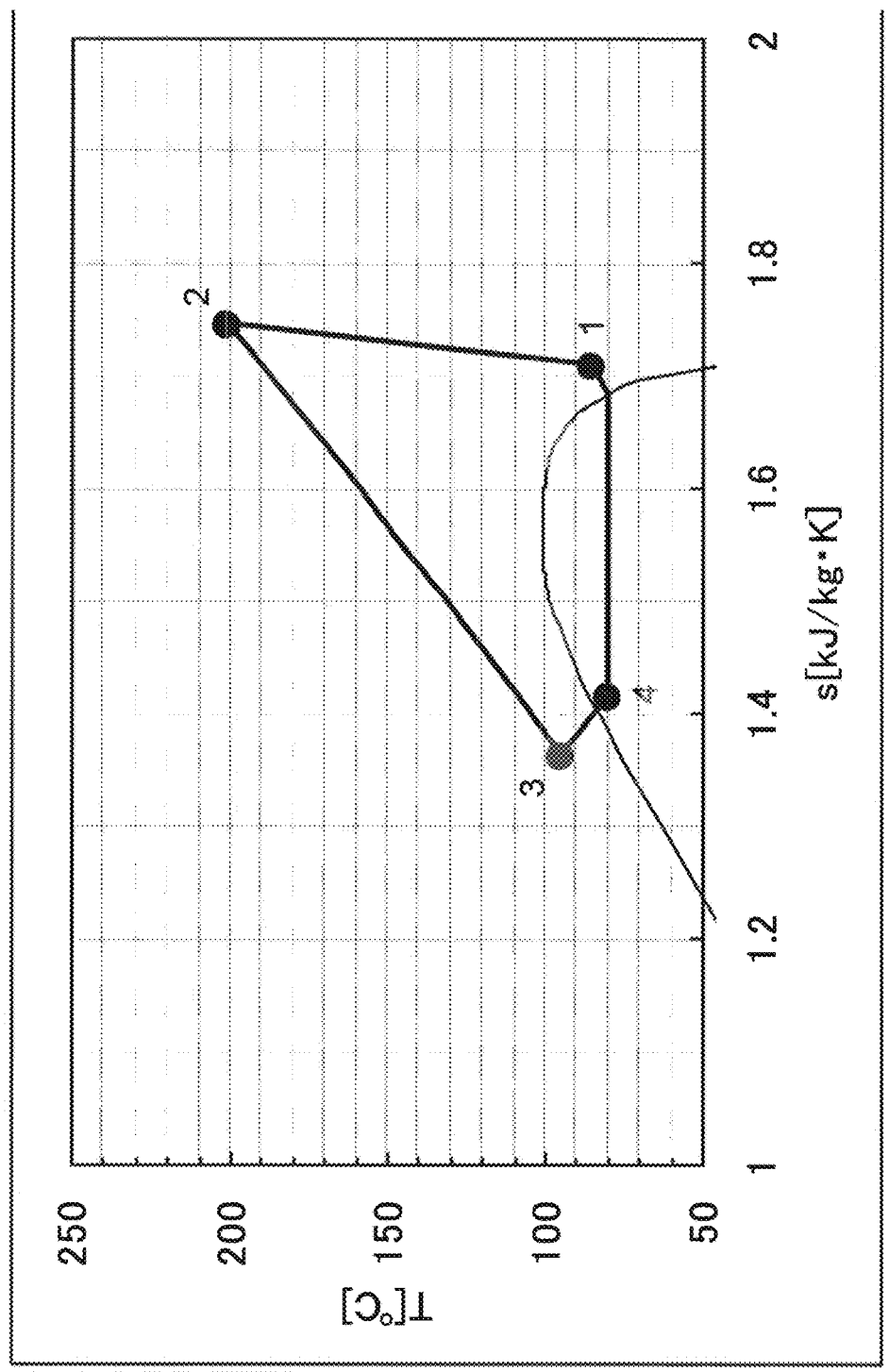
FIG. 9 is a T-s diagram in comparative example 4 provided as a comparison to the present invention.

1,1,1,2-tetrafluoroethane: HFC-134a 1,1,1,2-tetrafluoroethane was used instead of trans-1-chloro-3,3,3-trifluoropropene, and the steam compression cycle performance (COP$_H$) was evaluated under the calculation conditions 4. FIG. 9 is a T-s diagram in comparative example 4.

The calculation results of the high-temperature heat pump cycle performance (COP$_H$) in examples 1 through 4 and comparative examples 1 through 4 under the conditions 1 through 4 are compared in Tables 5 through 8. COP and CAP are each represented with a relative value with the value of HFC-134a being 1.

TABLE 5

Steam compression cycle calculation conditions 1
Evaporation temperature 80° C.;
Temperature at the compressor outlet 120° C.
(at the time of isentropic compression)

| Item | HFO-1234yf | HFC-134a |
|---|---|---|
| Temperature at the compressor outlet [° C.] | 121.4 | 121.9 |
| Evaporator pressure [MPa] | 2.52 | 2.63 |
| Gas cooler pressure [MPa] | 4.64 | 4.74 |
| Pressure ratio [—] | 1.84 | 1.80 |
| Relative COP [—] | 0.89 | 1.00 |
| Relative CAP [—] | 0.85 | 1.00 |

TABLE 6

Steam compression cycle calculation conditions 2
Evaporation temperature 80° C.;
Temperature at the compressor outlet 130° C.
(at the time of isentropic compression)

| Item | HFO-1234ze(E) | HFC-134a |
|---|---|---|
| Temperature at the compressor outlet [° C.] | 132.2 | 132.3 |
| Evaporator pressure [MPa] | 2.01 | 2.63 |
| Gas cooler pressure [MPa] | 4.49 | 5.58 |
| Pressure ratio [—] | 2.24 | 2.12 |
| Relative COP [—] | 1.02 | 1.00 |
| Relative CAP [—] | 0.80 | 1.00 |

TABLE 7

Steam compression cycle calculation conditions 3
Evaporation temperature 80° C.;
Temperature at the compressor outlet 170° C.
(at the time of isentropic compression)

| Item | HFO-1234ze(Z) | HFC-134a |
|---|---|---|
| Temperature at the compressor outlet [° C.] | 174.8 | 176.3 |
| Evaporator pressure [MPa] | 0.86 | 2.63 |
| Gas cooler pressure [MPa] | 4.30 | 12.61 |
| Pressure ratio [—] | 5.01 | 4.79 |
| Relative COP [—] | 1.24 | 1.00 |
| Relative CAP [—] | 0.39 | 1.00 |

TABLE 8

Steam compression cycle calculation conditions 4
Evaporation temperature 80° C.; Temperature at the
compressor outlet 190° C. (at the time of isentropic compression)

| Item | HCFO-1233zd(E) | HFC-134a |
|---|---|---|
| Temperature at the compressor outlet [° C.] | 195.3 | 200.9 |
| Evaporator pressure [MPa] | 0.66 | 2.63 |
| Gas cooler pressure [MPa] | 4.81 | 22.36 |
| Pressure ratio [—] | 7.31 | 8.49 |
| Relative COP [—] | 1.45 | 1.00 |
| Relative CAP [—] | 0.28 | 1.00 |

As shown in Tables 5 through 8, the method according to the present invention provides higher coefficients of performance (COP) than the method using HFC-134a, which is currently used.

As shown in Table 6, in comparative example 2 in which HFC-134a is used as the heat transmission medium when the temperature at the outlet of the compressor is 130° C. or higher, the pressure of the gas cooler exceeds 5.0 MPa. With such a pressure, the pressure resistance cost of the elements of the heat pump device such as the compressor, the gas cooler and the like is made high, which is not preferable.

As shown in Tables 7 and 8, in comparative examples 3 and 4 in which HFC-134a is used as the heat transmission medium when the temperature at the outlet of the compressor is 170° C. or higher, the pressure of the gas cooler exceeds 10 MPa. With such a pressure, the pressure resistance cost of the elements of the heat pump device such as the compressor, the gas cooler and the like is significantly high, which is still less preferable.

As shown in Tables 5 through 8, when being used for a high-temperature heat pump system that heats the fluid to be heated to 80° C. or higher, the method according to the present invention transmits heat at a gas cooler pressure of 5.0 MPa or lower at higher efficiency than the method using HFC-134a as the heat transmission medium.

Example 5

30 g of heat transmission medium was put into an autoclave formed of SUS316, heated to 150° C. and kept for 5 weeks. Presence/absence of a decomposition product of the heat transmission medium and presence/absence of an isomer product of the heat transmission medium were evaluated by use of gas chromatography. Table 9 shows the results.

TABLE 9

| | Purity [GC %] | | | |
|---|---|---|---|---|
| | Before the test | | 5 weeks later | |
| Heat transmission medium | Heat transmission medium | Geometrical isomer | Heat transmission medium | Geometrical isomer |
| HFO-1234ze(E) | 99.96 | 0.01 | 99.95 | 0.01 |
| HFO-1234ze(Z) | 99.71 | 0.01 | 99.71 | 0.01 |
| HCFO-1233zd(E) | 99.97 | 0.01 | 98.96 | 1.00 |

With any of the coolants, no thermal decomposition product was observed. As is clear from the results shown in Table 9, no isomerization reaction of HFO-1234ze advanced either from the trans isomer or the cis isomer. Regarding HCFO-1233zd, a small amount of trans isomer was confirmed to be isomerized. It is seen that the coolants used in the present invention have high thermal stability.

Example 6

A thermal stability test was performed using cis-1,3,3,3-tetrafluoropropene. In conformity to the sealed tube test of JIS-K-2211, "Refrigerating machine oils", 1.0 g of coolant and metal pieces (test pieces of iron, copper, and aluminum) were sealed in a glass test tube, heated to a predetermined temperature and kept for 2 weeks. The heating temperature was set to 175° C., 200° C. and 250° C. Two weeks later, the external appearance, the purity and the acid content (F$^-$ ion) of the coolant were measured to evaluate the thermal stability. Table 10 shows the results.

TABLE 10

| Temperature [° C.] | HFO-1234ze(Z) Purity [GC %] Heat transmission medium | HFO-1234ze(Z) Purity [GC %] Geometrical isomer | Acid content (F$^-$) [ppm] | External appearance |
|---|---|---|---|---|
| Before the test | 99.78 | 0.00 | None | Colorless, transparent |
| 175 | 99.68 | 0.11 | 3 | Colorless, transparent |
| 200 | 99.63 | 0.15 | 2 | Colorless, transparent |
| 250 | 96.33 | 3.26 | 5 | Colorless, transparent |

As is clear from the results shown in Table 10, no thermal decomposition product of the cis isomer of HFO-1234ze was observed. Under the temperature condition of 200° C. or lower, the isomerization reaction from the cis isomer of HFO-1234ze to the trans isomer thereof did not advance almost at all. The acid content (F$^-$) derived from the cis isomer of HFO-1234ze was minute. It is seen that the coolants used in the present invention have high thermal stability even in a high-temperature gaseous state.

Example 7

In conformity to the compatibility test of a coolant and a refrigerating machine oil of JIS-K-2211, "Refrigerating machine oils", 1.7 g of coolant and 0.3 g of refrigerating machine oil were put into a thick glass test tube and cooled with liquid nitrogen to solidify a mixture of the coolant and the refrigerating machine oil. After the mixture of the coolant and the refrigerating machine oil was solidified, a top part of the test tube and a vacuum pump were connected with each other to remove the remaining air, and the top part of the test tube was sealed by use of a gas burner. The sealed thick glass test tube was put into a thermostatic tank cooled to −20° C., and kept still until the temperature of the thermostatic tank and the temperature of the composition in the glass test tube became equal to each other. Then, the compatibility of the coolant and the refrigerating machine oil was evaluated by a visual check. The compatibility was evaluated while the temperature of the thermostatic tank was changed from −20 to +80° C. Tables 11 through 15 show the results. In Tables 11 through 15, "○" indicates that the coolant and the refrigerating machine oil were uniformly mixed, and "x" indicates that the coolant and the refrigerating machine oil were separated into two layers or that the composition was clouded.

For the compatibility test, the following five types of lubricant were used.

Mineral oil (MO): SUNISO 4GS (produced by Japan Sun Oil Company, Ltd.)

Polyolester oil (POE): SUNICE T68 (produced by Japan Sun Oil Company, Ltd.)

Alkylbenzene oil (AB): ATMOS 68N (produced by JX Nippon Oil & Energy Corporation)

Polyalkyleneglycol oil (PAG): SUNICE P56 (produced by Japan Sun Oil Company, Ltd.)

Polyvinylether oil (PVE): Daphne Hermetic Oil FVC68D (produced by Idemitsu Kosan Co., Ltd.)

TABLE 11

Refrigerating machine oil: mineral oil (SUNISO 4GS)

| Temperature [° C.] | HFO-1234ze (E) | HFO-1234ze (Z) | HCFO-1233zd (E) | HCFO-1233zd (Z) |
|---|---|---|---|---|
| −20 | x | x | ○ | ○ |
| 0 | x | x | ○ | ○ |
| 20 | x | x | ○ | ○ |
| 40 | x | x | ○ | ○ |
| 60 | x | x | ○ | ○ |
| 80 | x | x | ○ | ○ |

TABLE 12

Refrigerating machine oil: Polyolester oil (SUNICE T68)

| Temperature [° C] | HFO-1234ze (E) | HFO-1234ze (Z) | HCFO-1233zd (E) | HCFO-1233zd (Z) |
|---|---|---|---|---|
| −20 | ○ | ○ | ○ | ○ |
| 0 | ○ | ○ | ○ | ○ |
| 20 | ○ | ○ | ○ | ○ |
| 40 | ○ | ○ | ○ | ○ |
| 60 | ○ | ○ | ○ | ○ |
| 80 | ○ | ○ | ○ | ○ |

TABLE 13

Refrigerating machine oil: Alkylbenzene oil (ATMOS 68N)

| Temperature [° C.] | HFO-1234ze (E) | HFO-1234ze (Z) | HCFO-1233zd (E) | HCFO-1233zd (Z) |
|---|---|---|---|---|
| −20 | x | x | ○ | ○ |
| 0 | x | x | ○ | ○ |
| 20 | x | x | ○ | ○ |
| 40 | x | x | ○ | ○ |
| 60 | x | x | ○ | ○ |
| 80 | x | x | ○ | ○ |

TABLE 14

Refrigerating machine oil: Polyalkyleneglycol oil (SUNICE P56)

| Temperature [° C.] | HFO-1234ze (E) | HFO-1234ze (Z) | HCFO-1233zd (E) | HCFO-1233zd (Z) |
|---|---|---|---|---|
| −20 | ○ | ○ | ○ | ○ |
| 0 | ○ | ○ | ○ | ○ |
| 20 | ○ | ○ | ○ | ○ |
| 40 | ○ | ○ | ○ | ○ |
| 60 | ○ | ○ | ○ | ○ |
| 80 | ○ | ○ | ○ | ○ |

TABLE 15

| Temperature [° C.] | HFO-1234ze (E) | HFO-1234ze (Z) | HCFO-1233zd (E) | HCFO-1233zd (Z) |
|---|---|---|---|---|
| \<Refrigerating machine oil: Polyvinylether oil (Daphne Hermetic Oil FVC68D)\> | | | | |
| −20 | ○ | ○ | ○ | ○ |
| 0 | ○ | ○ | ○ | ○ |
| 20 | ○ | ○ | ○ | ○ |
| 40 | ○ | ○ | ○ | ○ |
| 60 | ○ | ○ | ○ | ○ |
| 80 | ○ | ○ | ○ | ○ |

All the coolants exhibited good compatibility with POE, which was synthetic oil. Regarding HCFO-1233zd containing chlorine, both of the trans isomer and the cis isomer exhibited good compatibility also with the mineral oil.

<Mixed Heat Transmission Medium of Two Types of Fluorinated Olefin>

As described above, according to the present invention, a mixture of two or more types of fluorinated olefin may be used as a heat transmission medium. Hereinafter, performance evaluations on high-temperature heat pump cycles each using a mixed heat transmission medium of two or more types of fluorinated olefin will be described. Table 16 shows high-temperature heat pump cycle calculation conditions 5.

TABLE 16

Transcritical high-temperature heat pump cycle calculation conditions 5

| | | |
|---|---|---|
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 170 [° C.] |
| Temperature at the gas cooler outlet | $T_{GCout}$ | 95 [° C.] |
| Compressor efficiency | η | 0.7 [—] |

For calculating the high-temperature heat pump cycle performance ($COP_H$), the following conditions were assumed.

(A) The compression performed by the compressor is isentropic compression.

(B) The throttle expansion performed by the expansion valve is isenthalpic expansion.

(C) The heat loss and the pressure loss in the pipe and the heat exchanger are ignored.

(D) The compressor efficiency η is 0.7.

Hereinafter, equations used to calculate the high-temperature heat pump cycle performance ($COP_H$) will be described in detail. The input heat amount $Q_{EVA}$ to the evaporator is:

$$Q_{EVA} = G \times (h_1 - h_4) \quad (7)$$

The released heat amount $Q_{GC}$ from the gas cooler is:

$$Q_{GC} = G \times (h_2 - h_3) \quad (8)$$

It should be noted that where the enthalpy of the coolant at the outlet of the compressor after the isentropic compression is represented by $h_{2th}$, enthalpy $h_2$ of the coolant at the outlet of the compressor calculated in consideration of the compressor efficiency is:

$$h_2 = h_1 + (h_{2th} - h_1)/\eta \quad (9)$$

Work W given by the compressor for compressing the coolant steam is:

$$W = G \times (h_2 - h_1) \quad (10)$$

The coefficient of performance ($COP_H$) of the high-temperature heat pump cycle is:

$$COP_H = Q_{GC}/W = (h_2 - h_3)/(h_2 - h_1) \quad (11)$$

Now, an equation used to calculate the volume capability (CAP) of the heat transmission medium will be described in detail. The steam density of the heat transmission medium at the absorption inlet of the compressor is $\rho_2$, and the amount of heat released from the gas cooler is $Q_{GC}$. Therefore, $$CAP = \rho_2 \times Q_{GC} = \rho_2 \times G \times (h_2 - h_3) \quad (12)$$

In (7) through (12) above, the symbols represent the following:

G: Amount of circulating heat transmission medium
W: Compression work
$Q_{EVA}$: Input heat amount
$Q_{GC}$: Released heat amount
$COP_H$: Coefficient of performance (heating)
CAP: Volume capability (heating)
h: Specific enthalpy
1,2,3,4: Cycle point
$2_{th}$: Cycle point after isentropic compression

Example 8

Figure 10:
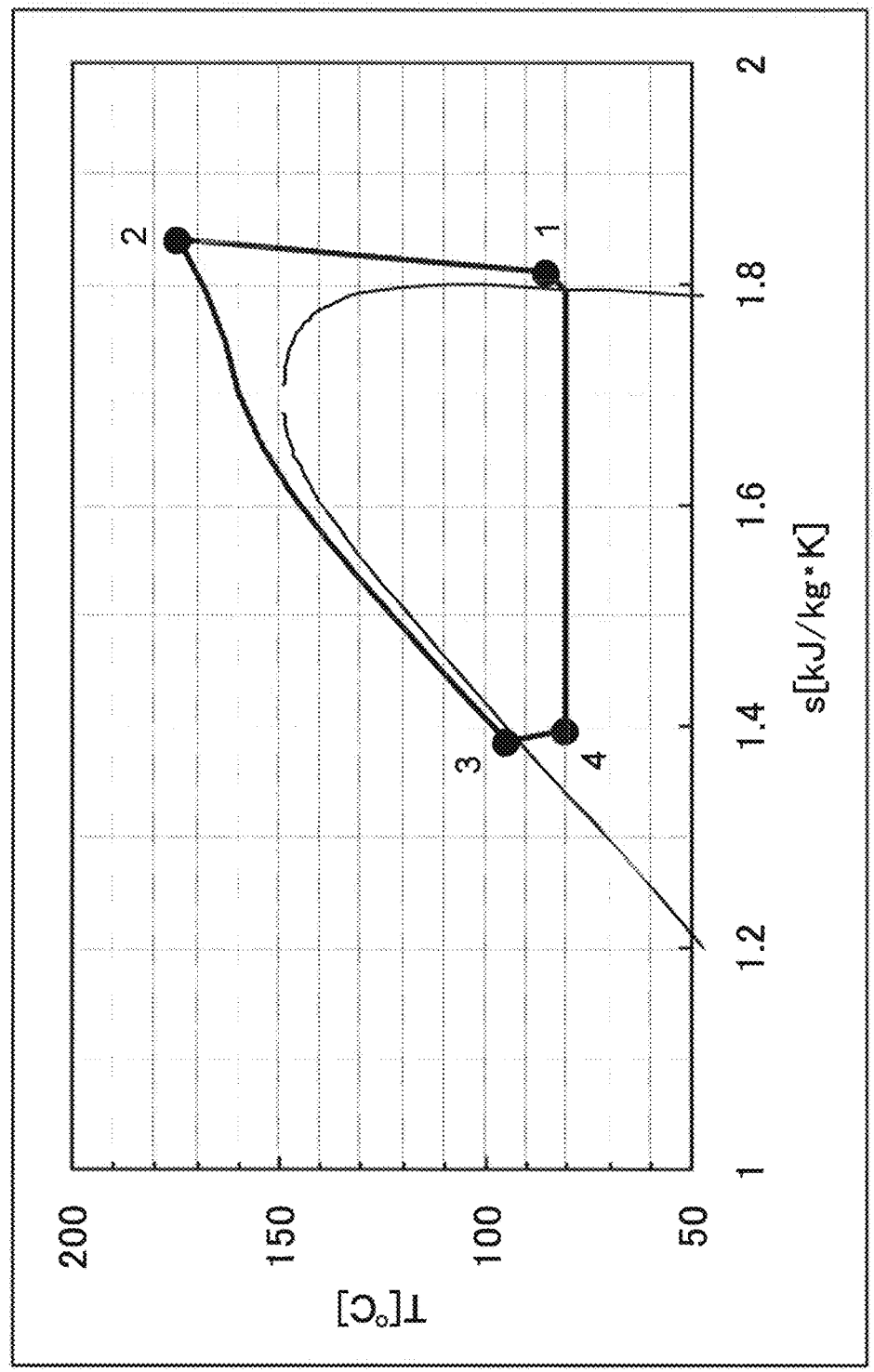
FIG. 10 is a T-s diagram in example 8 according to the present invention.

Mixed Heat Transmission Medium of cis-1,3,3,3-tetrafluoropropene: HFO-1234Ze (Z) and 1,1,1,3,3-pentafluoropropane: HFC-245Fa A mixed heat transmission medium of cis-1,3,3,3-tetrafluoropropene and 1,1,1,3,3-pentafluoropropane was used as the mixed heat transmission medium to evaluate the steam compression cycle performance ($COP_H$) under the calculation conditions 5. The mixture ratio and the performance evaluation are shown in Table 17. FIG. 10 is a T-s diagram in example 8 in the case where HFO-1234ze (Z)/HFC-245fa=95/5.

TABLE 17

| | | Heat transmission medium | | | | | |
|---|---|---|---|---|---|---|---|
| | | HFO-1234ze(Z)/HFC-245fa | | | | | HFC-134a |
| Mass ratio | | 90/10 | 95/5 | 97/3 | 98/2 | 99/1 | — |
| Temperature at the compressor outlet | [° C.] | 174.6 | 174.7 | 174.8 | 174.8 | 174.8 | 176.3 |

TABLE 17-continued

| | | Heat transmission medium | | | | | |
|---|---|---|---|---|---|---|---|
| | | HFO-1234ze(Z)/HFC-245fa | | | | | HFC-134a |
| Mass ratio | | 90/10 | 95/5 | 97/3 | 98/2 | 99/1 | — |
| Evaporation pressure | [MPa] | 0.87 | 0.87 | 0.86 | 0.86 | 0.86 | 2.63 |
| Gas cooler pressure | [MPa] | 4.40 | 4.35 | 4.33 | 4.32 | 4.31 | 12.61 |
| Pressure ratio | [—] | 5.04 | 5.02 | 5.02 | 5.01 | 5.01 | 4.79 |
| Relative COP | [—] | 1.24 | 1.24 | 1.24 | 1.24 | 1.24 | 1.00 |
| Relative CAP | [—] | 0.40 | 0.39 | 0.39 | 0.39 | 0.39 | 1.00 |

Example 9

Mixed Heat Transmission Medium of Cis-1,3,3,3-tetrafluoropropene: HFO-1234Ze (Z) and trans-1-chloro-3,3,3-trifluoro-1-propene: HCFO-1233zd (E)

Figure 11:
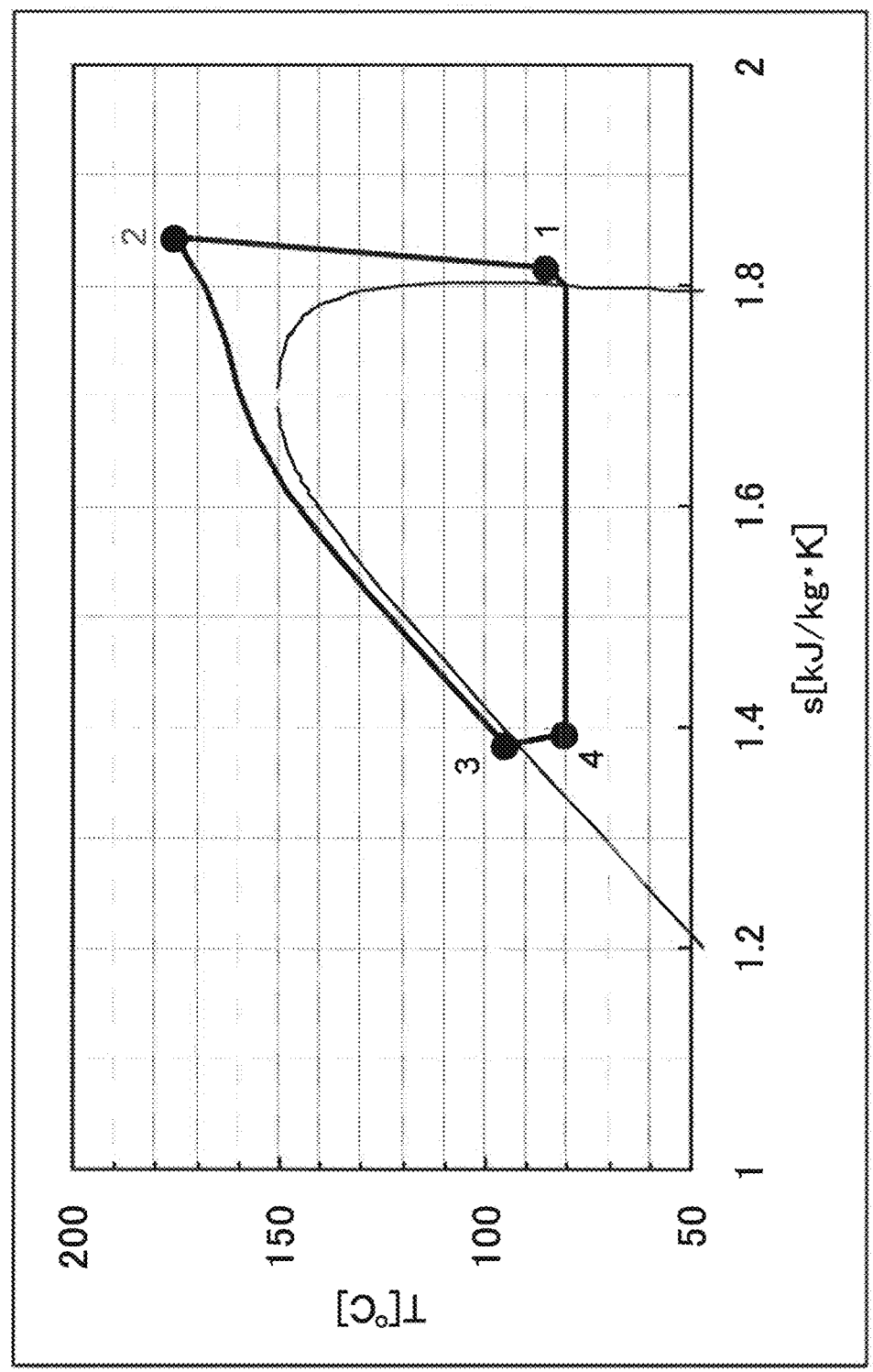
FIG. 11 is a T-s diagram in example 9 according to the present invention.

A mixed heat transmission medium of cis-1,3,3,3-tetrafluoropropene and trans-1-chloro-3,3,3-trifluoro-1-propene was used as the mixed heat transmission medium to evaluate the steam compression cycle performance ($COP_H$) under the calculation conditions 5. The mixture ratio and the performance evaluation are shown in Table 18. FIG. 11 is a T-s diagram in example 9 in the case where HFO-1234ze (Z)/HCFO-1233zd (E)=95/5.

TABLE 18

| | | Heat transmission medium | | | | | | | |
|---|---|---|---|---|---|---|---|---|---|
| | | HFO-1234ze(Z)/HCFO-1233zd(E) | | | | | | | HFC-134a |
| Mass ratio | | 50/50 | 70/30 | 90/10 | 95/5 | 97/3 | 98/2 | 99/1 | — |
| Temperature at the compressor outlet | [° C.] | 175.0 | 174.9 | 174.8 | 174.8 | 174.8 | 174.8 | 174.8 | 176.3 |
| Evaporation pressure | [MPa] | 0.77 | 0.81 | 0.85 | 0.85 | 0.85 | 0.86 | 0.86 | 2.63 |
| Gas cooler pressure | [MPa] | 4.00 | 4.14 | 4.25 | 4.28 | 4.28 | 4.29 | 4.29 | 12.61 |
| Pressure ratio | [—] | 5.16 | 5.09 | 5.03 | 5.02 | 5.01 | 5.01 | 5.01 | 4.79 |
| Relative COP | [—] | 1.23 | 1.23 | 1.24 | 1.24 | 1.24 | 1.24 | 1.24 | 1.00 |
| Relative CAP | [—] | 0.36 | 0.37 | 0.39 | 0.39 | 0.39 | 0.39 | 0.39 | 1.00 |

Example 10

Figure 12:
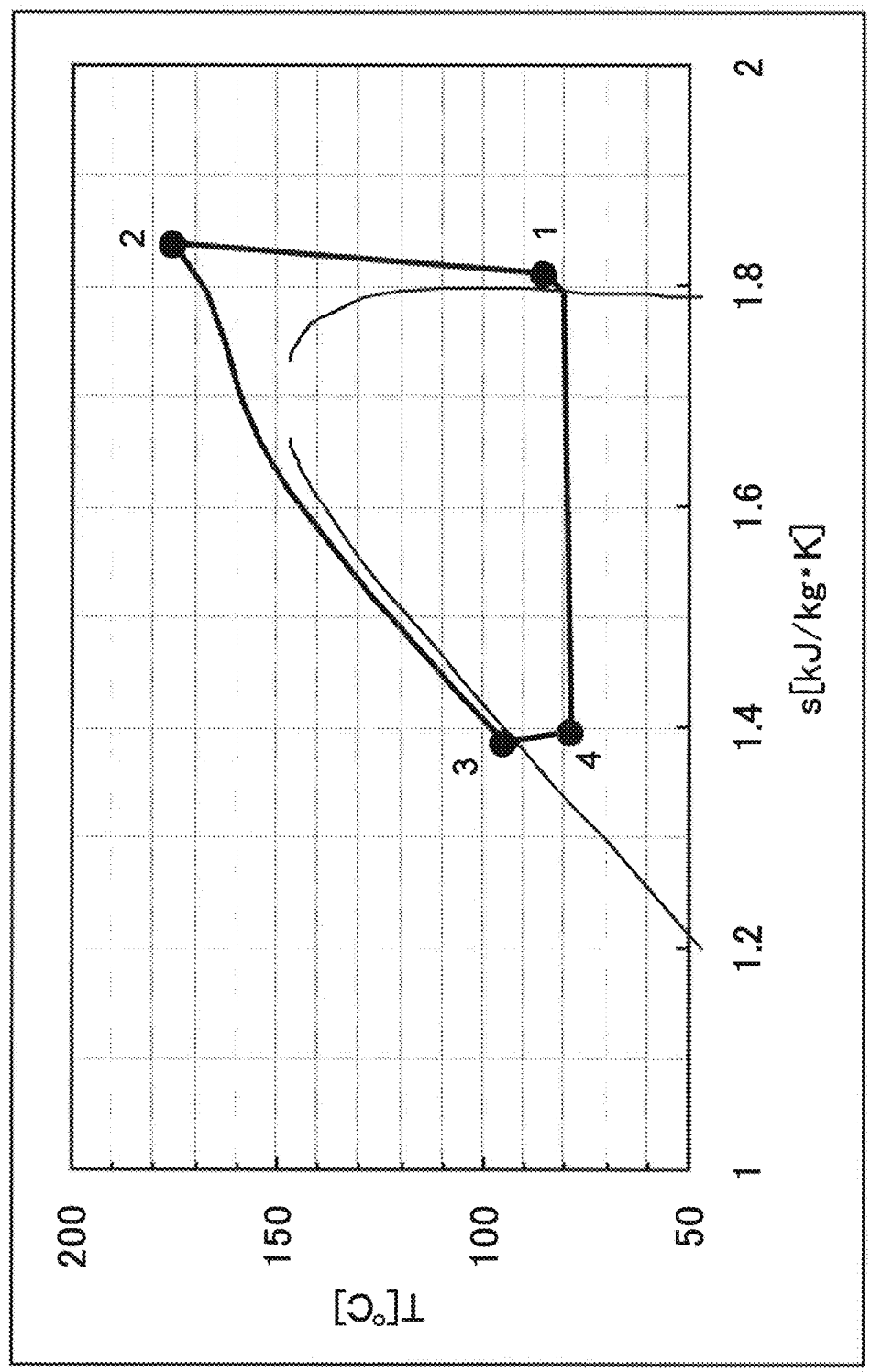
FIG. 12 is a T-s diagram in example 10 according to the present invention.

Mixed Heat Transmission Medium of cis-1,3,3,3-tetrafluoropropene: HFO-1234ze (Z) and 2,3,3,3-tetrafluoropropene: HFO-1234yf A mixed heat transmission medium of cis-1,3,3,3-tetrafluoropropene and 2,3,3,3-tetrafluoropropene was used as the mixed heat transmission medium to evaluate the steam compression cycle performance ($COP_H$) under the calculation conditions 5. The mixture ratio and the performance evaluation are shown in Table 19. FIG. 12 is a T-s diagram in example 10 in the case where HFO-1234ze (Z)/HFO-1234yf=95/5.

TABLE 19

| Mass ratio | | HFO-1234ze(Z)/HFO-1234yf | | | | | HFC-134a |
|---|---|---|---|---|---|---|---|
| | | 90/10 | 95/5 | 97/3 | 98/2 | 99/1 | — |
| Temperature at the compressor outlet | [° C.] | 174.9 | 174.9 | 174.9 | 174.8 | 174.8 | 176.3 |
| Evaporation pressure | [MPa] | 0.93 | 0.89 | 0.88 | 0.87 | 0.87 | 2.63 |
| Gas cooler pressure | [MPa] | 4.66 | 4.47 | 4.40 | 4.37 | 4.33 | 12.61 |
| Pressure ratio | [—] | 4.99 | 5.00 | 5.00 | 5.00 | 5.01 | 4.79 |
| Relative COP | [—] | 1.21 | 1.23 | 1.23 | 1.24 | 1.24 | 1.00 |
| Relative CAP | [—] | 0.41 | 0.40 | 0.40 | 0.40 | 0.39 | 1.00 |

Example 11

Mixed Heat Transmission Medium of cis-1,3,3,3-tetrafluoropropene: HFO-1234ze (Z) and trans-1,3,3,3-tetrafluoropropene: HFO-1234ze (E)

Figure 13:
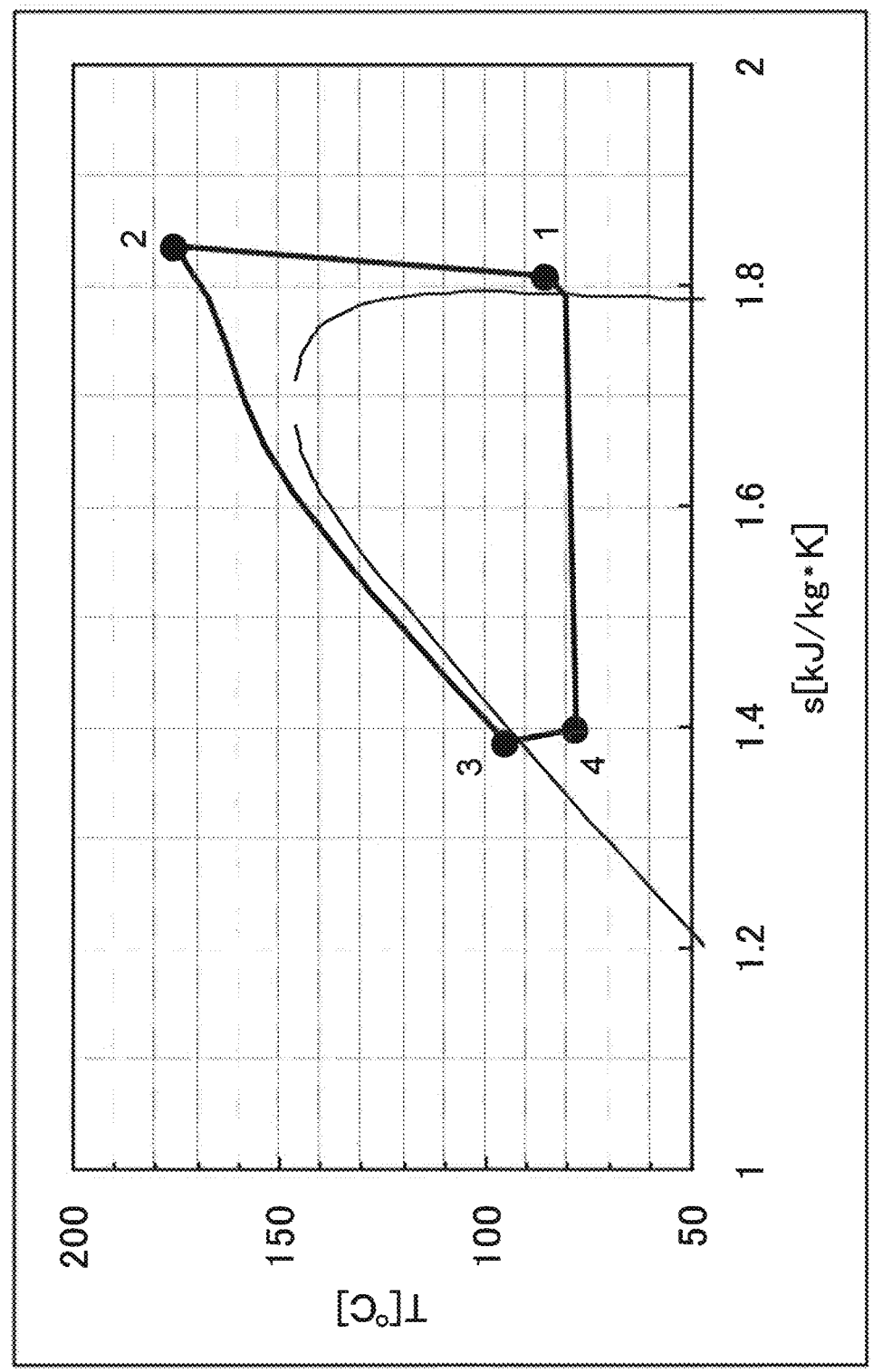
FIG. 13 is a T-s diagram in example 11 according to the present invention.

A mixed heat transmission medium of cis-1,3,3,3-tetrafluoropropene and trans-1,3,3,3-tetrafluoropropene was used as the mixed heat transmission medium to evaluate the steam compression cycle performance ($COP_H$) under the calculation conditions 5. The mixture ratio and the performance evaluation are shown in Table 20. FIG. 13 is a T-s diagram in example 11 in the case where HFO-1234ze (Z)/HFO-1234ze (E)=95/5.

TABLE 20

| Mass ratio | | HFO-1234ze(Z)/HFO-1234ze(E) | | | | | HFC-134a |
|---|---|---|---|---|---|---|---|
| | | 90/10 | 95/5 | 97/3 | 98/2 | 99/1 | — |
| Temperature at the compressor outlet | [° C.] | 174.9 | 174.9 | 174.8 | 174.9 | 174.8 | 176.3 |
| Evaporation pressure | [MPa] | 0.93 | 0.89 | 0.86 | 0.87 | 0.87 | 2.63 |
| Gas cooler pressure | [MPa] | 4.62 | 4.46 | 4.30 | 4.36 | 4.33 | 12.61 |
| Pressure ratio | [—] | 4.99 | 5.00 | 5.01 | 5.00 | 5.00 | 4.79 |
| Relative COP | [—] | 1.22 | 1.23 | 1.24 | 1.24 | 1.24 | 1.00 |
| Relative CAP | [—] | 0.41 | 0.40 | 0.39 | 0.40 | 0.39 | 1.00 |

Example 12

Figure 14:
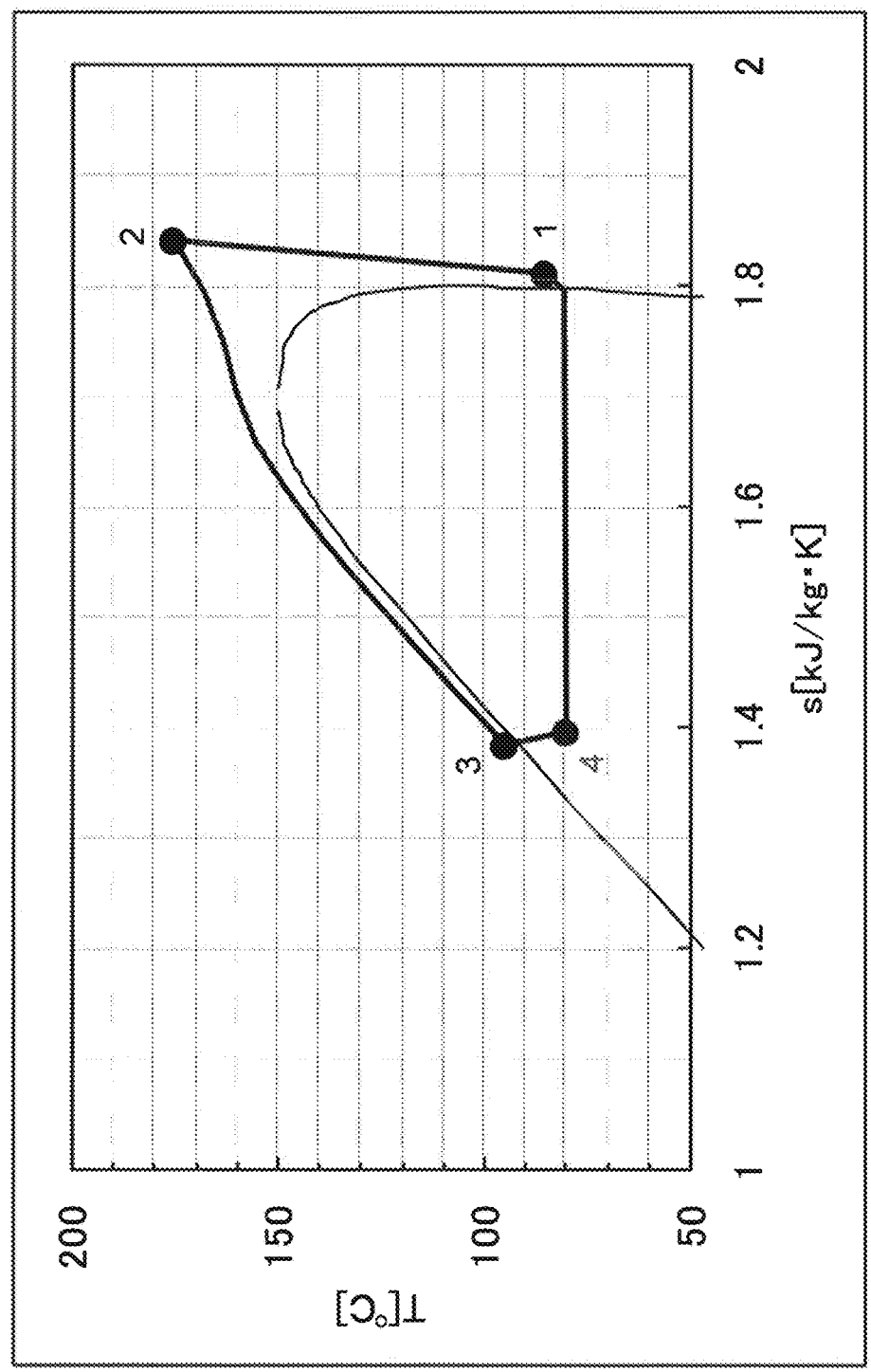
FIG. 14 is a T-s diagram in example 12 according to the present invention.

Mixed Heat Transmission Medium of cis-1,3,3,3-tetrafluoropropene: HFO-1234ze (Z), trans-1-chloro-3,3,3-trifluoro-1-propene: HCFO-1233zd (E) and 1,1,1,3,3-pentafluoropropane: HFC-245fa A mixed heat transmission medium of cis-1,3,3,3-tetrafluoropropene, trans-1-chloro-3,3,3-trifluoro-1-propene and 1,1,1,3,3-pentafluoropropane was used as the mixed heat transmission medium. The mixture ratio and the performance evaluation are shown in Table 21. FIG. 14 is a T-s diagram in example 12 in the case where HFO-1234ze (Z)/HCFO-1233zd (E)/HFC-245fa=95/3/2.

TABLE 21

| Mass ratio | | HFO-1234ze(Z)/HCFO-1233zd(E)/245fa | | | HFC-134a |
|---|---|---|---|---|---|
| | | 95/3/2 | 90/5/5 | 80/10/10 | — |
| Temperature at the compressor outlet | [° C.] | 174.8 | 174.7 | 174.6 | 176.3 |
| Evaporation pressure | [MPa] | 0.86 | 0.86 | 0.86 | 2.63 |
| Gas cooler pressure | [MPa] | 4.30 | 4.32 | 4.34 | 12.61 |
| Pressure ratio | [—] | 5.02 | 5.03 | 5.07 | 4.79 |
| Relative COP | [—] | 1.24 | 1.24 | 1.24 | 1.00 |
| Relative CAP | [—] | 0.39 | 0.39 | 0.39 | 1.00 |

As described above, it is clear that the mixed heat transmission mediums according to the present invention have superb performance as compared with 1,1,1,2-tetrafluoromethane.

Hereinafter, performance evaluations on high-temperature heat pump cycles each using a mixed heat transmission medium of two or more types of fluorinated olefin will be described. Table 22 shows high-temperature heat pump cycle calculation conditions 6.

TABLE 22

| Transcritical high-temperature heat pump cycle calculation conditions 6 | | |
| --- | --- | --- |
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 140 [° C.] |
| Temperature at the gas cooler outlet | $T_{GCout}$ | 95 [° C.] |
| Compressor efficiency | η | 0.7 [—] |

The heat pump cycle conditions 6 are made with an assumption that pressurized hot water of 130° C. is generated by heat exchange with heat source water in the gas cooler.

Example 13

Mixed Heat Transmission Medium of cis-1,3,3,3-tetrafluoropropene: HFO-1234ze (Z) and trans-1,3,3,3-tetrafluoropropene: HFO-1234ze (E)

Figure 15:
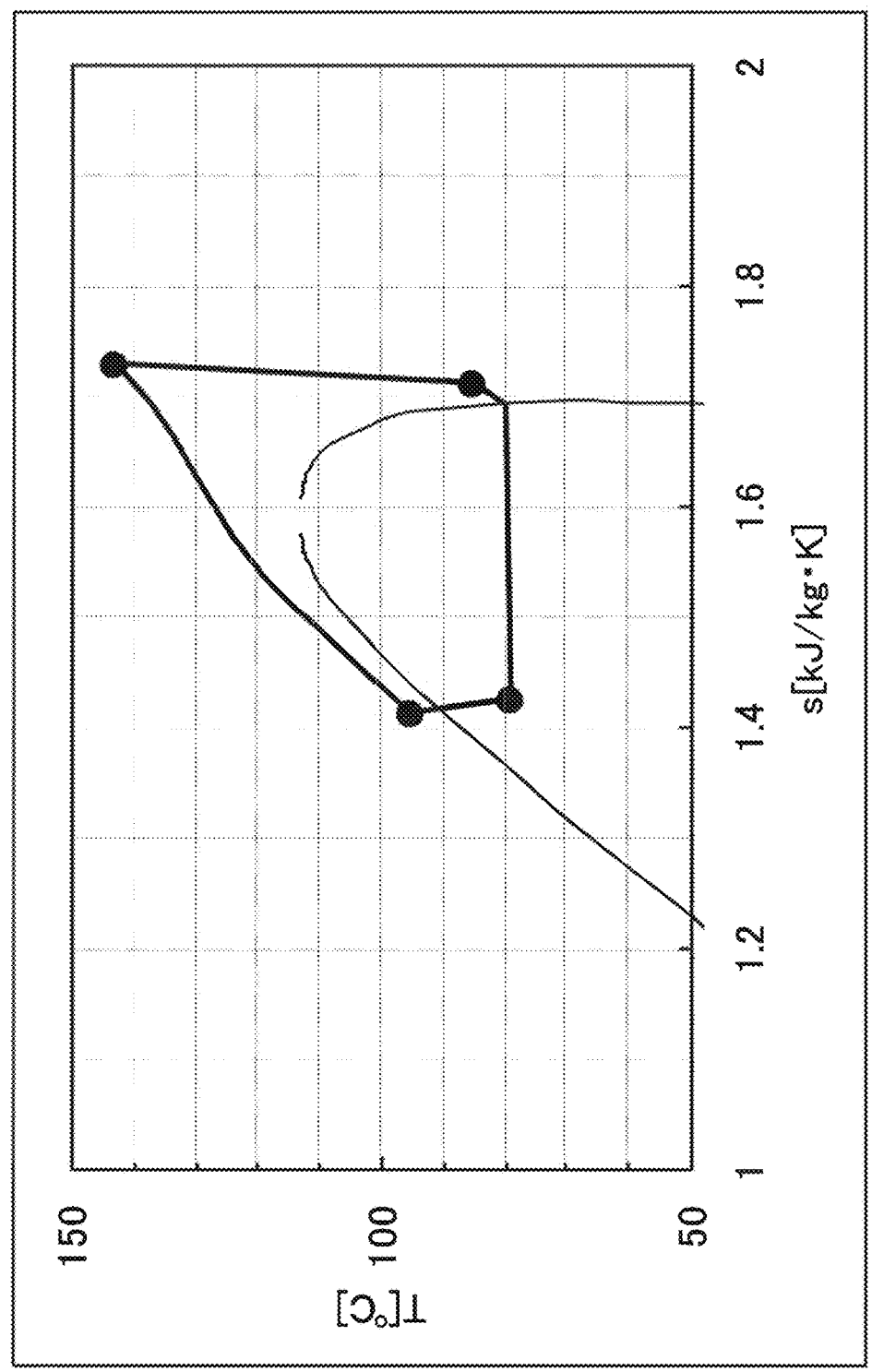
FIG. 15 is a T-s diagram in example 13 according to the present invention.

A mixed heat transmission medium of cis-1,3,3,3-tetrafluoropropene and trans-1,3,3,3-tetrafluoropropene was used as the mixed heat transmission medium to evaluate the steam compression cycle performance ($COP_H$) under the calculation conditions 6. The mixture ratio and the performance evaluation are shown in Table 23. FIG. 15 is a T-s diagram in example 13 in the case where HFO-1234ze (Z)/HFO-1234ze (E)=10/90.

TABLE 23

| | | Heat transmission medium | | | | | | |
| --- | --- | --- | --- | --- | --- | --- | --- | --- |
| | | HFO-1234ze(Z)/HFO-1234ze(E) | | | | | | HFC-134a |
| Mass ratio | | 5/95 | 10/90 | 20/80 | 30/70 | 40/60 | 50/50 | — |
| Temperature at the compressor outlet | [° C.] | 142.7 | 142.8 | 143.0 | 143.2 | 143.6 | 143.9 | 142.8 |
| Evaporation pressure | [MPa] | 1.9 | 1.9 | 1.7 | 1.6 | 1.4 | 1.3 | 2.6 |
| Gas cooler pressure | [MPa] | 5.2 | 5.0 | 4.7 | 4.3 | 4.0 | 3.8 | 6.6 |
| Pressure ratio | [—] | 2.7 | 2.7 | 2.7 | 2.8 | 2.9 | 2.9 | 2.5 |
| Relative COP | [—] | 1.03 | 1.03 | 1.03 | 1.03 | 1.03 | 1.03 | 1.00 |
| Relative CAP | [—] | 0.77 | 0.75 | 0.70 | 0.66 | 0.62 | 0.58 | 1.00 |

From the results shown in Table 23, it has been made clear that under the calculation conditions 6 in which the evaporation temperature is 80° C. and the temperature at the outlet of the compressor is 140° C., HFO-1234ze (Z) is preferably contained at 10% by mass or more and HFO-1234ze (E) is preferably contained at 90% by mass or less.

Hereinafter, performance evaluations on high-temperature heat pump cycles each using a mixed heat transmission medium of two or more types of fluorinated olefin will be described. Table 24 shows high-temperature heat pump cycle calculation conditions 7.

TABLE 24

| Transcritical high-temperature heat pump cycle calculation conditions 7 | | |
| --- | --- | --- |
| Evaporation temperature | $T_{EVA}$ | 80 [° C.] |
| Degree of superheat | $T_{sh}$ | 5 [K] |
| Temperature at the compressor outlet (at the time of isentropic compression | $T_{2th}$ | 150 [° C.] |
| Temperature at the gas cooler outlet | $T_{GCout}$ | 95 [° C.] |
| Compressor efficiency | η | 0.7 [—] |

The heat pump cycle conditions 7 are made with an assumption that pressurized hot water of 140° C. is generated by heat exchange with heat source water in the gas cooler.

Example 14

Mixed Heat Transmission Medium of cis-1,3,3,3-tetrafluoropropene: HFO-1234ze (Z) and trans-1,3,3,3-tetrafluoropropene: HFO-1234ze (E)

Figure 16:
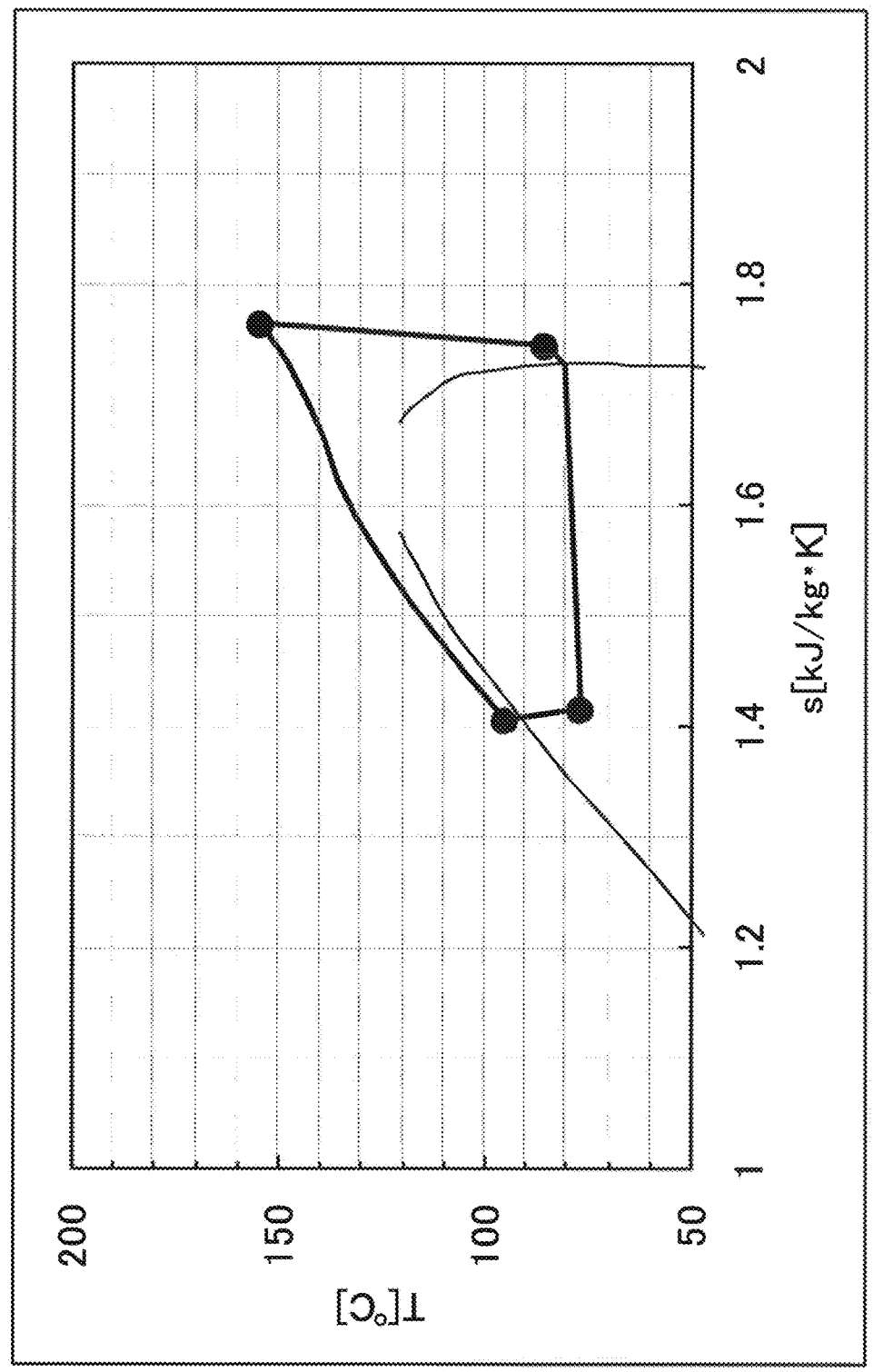
FIG. 16 is a T-s diagram in example 14 according to the present invention.

A mixed heat transmission medium of cis-1,3,3,3-tetrafluoropropene and trans-1,3,3,3-tetrafluoropropene was used as the mixed heat transmission medium to evaluate the steam compression cycle performance ($COP_H$) under the calculation conditions 7. The mixture ratio and the performance evaluation are shown in Table 25. FIG. 16 is a T-s diagram in example 14 in the case where HFO-1234ze (Z)/HFO-1234ze (E)=35/65.

TABLE 25

| Mass ratio | | \multicolumn{6}{c}{Heat transmission medium} | HFC-134a |
| --- | --- | --- | --- | --- | --- | --- | --- | --- |
| | | \multicolumn{6}{c}{HFO-1234ze(Z)/HFO-1234ze(E)} | |
| | | 30/70 | 35/65 | 40/60 | 50/50 | 60/40 | 70/30 | — |
| Temperature at the compressor outlet | [° C.] | 153.6 | 153.7 | 153.8 | 154.0 | 154.3 | 154.5 | 153.6 |
| Evaporation pressure | [MPa] | 1.6 | 1.5 | 1.4 | 1.3 | 1.2 | 1.1 | 2.6 |
| Gas cooler pressure | [MPa] | 5.1 | 5.0 | 4.8 | 4.4 | 4.1 | 3.9 | 8.0 |
| Pressure ratio | [—] | 3.3 | 3.3 | 3.4 | 3.4 | 3.5 | 3.6 | 3.0 |
| Relative COP | [—] | 1.06 | 1.06 | 1.06 | 1.06 | 1.06 | 1.07 | 1.00 |
| Relative CAP | [—] | 0.64 | 0.62 | 0.60 | 0.56 | 0.53 | 0.50 | 1.00 |

From the results shown in Table 25, it has been made clear that under the calculation conditions 7 in which the evaporation temperature is 80° C. and the temperature at the outlet of the compressor is 150° C., HFO-1234ze (Z) is preferably contained at 35% by mass or more and HFO-1234ze (E) is preferably contained at 65% by mass or less.

Hereinafter, performance evaluations on high-temperature heat pump cycles each using a mixed heat transmission medium of two or more types of fluorinated olefin will be described. Table 26 shows high-temperature heat pump cycle calculation conditions 8.

TABLE 26

Transcritical high-temperature heat pump cycle calculation conditions 8

| Evaporation temperature | $T_{EVA}$ | 80 [° C.] |
| --- | --- | --- |
| Degree of superheat | $T_{sh}$ | 5 [K] |
| Temperature at the compressor outlet (at the time of isentropic compression) | $T_{2th}$ | 160 [° C.] |

TABLE 26-continued

Transcritical high-temperature heat pump cycle calculation conditions 8

| Temperature at the gas cooler outlet | $T_{GCout}$ | 95 [° C.] |
| --- | --- | --- |
| Compressor efficiency | $\eta$ | 0.7 [—] |

The heat pump cycle conditions 8 are made with an assumption that pressurized hot water of 150° C. is generated by heat exchange with heat source water in the gas cooler.

Example 15

Mixed Heat Transmission Medium of cis-1,3,3,3-tetrafluoropropene: HFO-1234ze (Z) and trans-1,3,3,3-tetrafluoropropene: HFO-1234ze (E)

Figure 17:
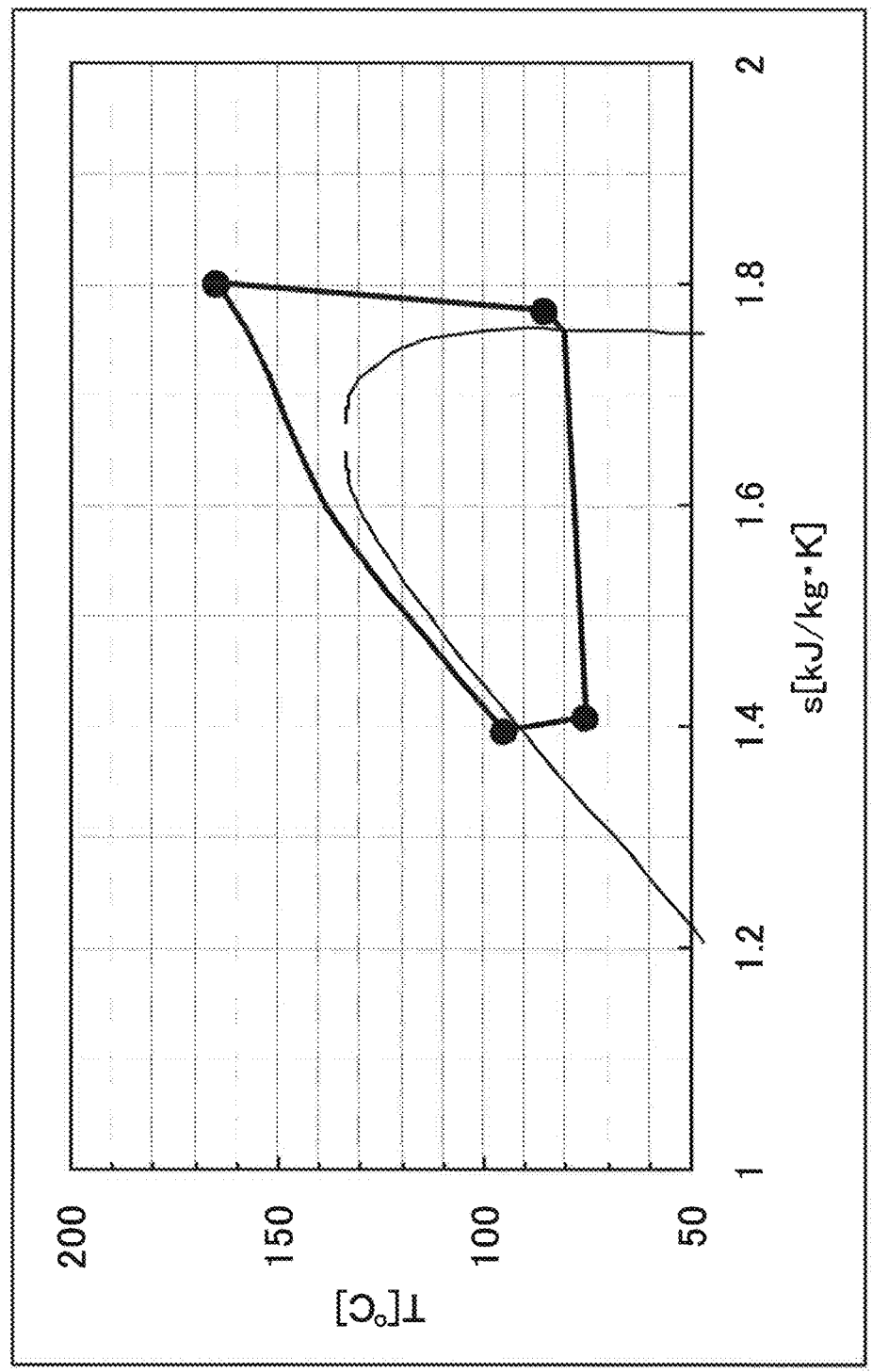
FIG. 17 is a T-s diagram in example 15 according to the present invention.

A mixed heat transmission medium of cis-1,3,3,3-tetrafluoropropene and trans-1,3,3,3-tetrafluoropropene was used as the mixed heat transmission medium to evaluate the steam compression cycle performance ($COP_H$) under the calculation conditions 8. The mixture ratio and the performance evaluation are shown in Table 27. FIG. 17 is a T-s diagram in example 15 in the case where HFO-1234ze (Z)/HFO-1234ze (E)=60/40.

TABLE 27

| Mass ratio | | \multicolumn{6}{c}{Heat transmission medium} | HFC-134a |
| --- | --- | --- | --- | --- | --- | --- | --- | --- |
| | | \multicolumn{6}{c}{HFO-1234ze(Z)/HFO-1234ze(E)} | |
| | | 50/50 | 60/40 | 65/35 | 70/30 | 75/25 | 80/20 | — |
| Temperature at the compressor outlet | [° C.] | 164.4 | 164.5 | 164.5 | 164.6 | 164.7 | 164.7 | 164.8 |
| Evaporation pressure | [MPa] | 1.3 | 1.2 | 1.1 | 1.1 | 1.0 | 1.0 | 2.6 |
| Gas cooler pressure | [MPa] | 5.3 | 4.9 | 4.7 | 4.5 | 4.4 | 4.2 | 9.9 |
| Pressure ratio | [—] | 4.1 | 4.1 | 4.1 | 4.2 | 4.2 | 4.2 | 3.8 |
| Relative COP | [—] | 1.10 | 1.11 | 1.12 | 1.12 | 1.13 | 1.13 | 1.00 |
| Relative CAP | [—] | 0.55 | 0.51 | 0.50 | 0.48 | 0.47 | 0.45 | 1.00 |

From the results shown in Table 27, it has been made clear that under the calculation conditions 8 in which the evaporation temperature is 80° C. and the temperature at the outlet of the compressor is 160° C., HFO-1234ze (Z) is preferably contained at 60% by mass or more and HFO-1234ze (E) is preferably contained at 40% by mass or less.

Example 16

Figure 18:
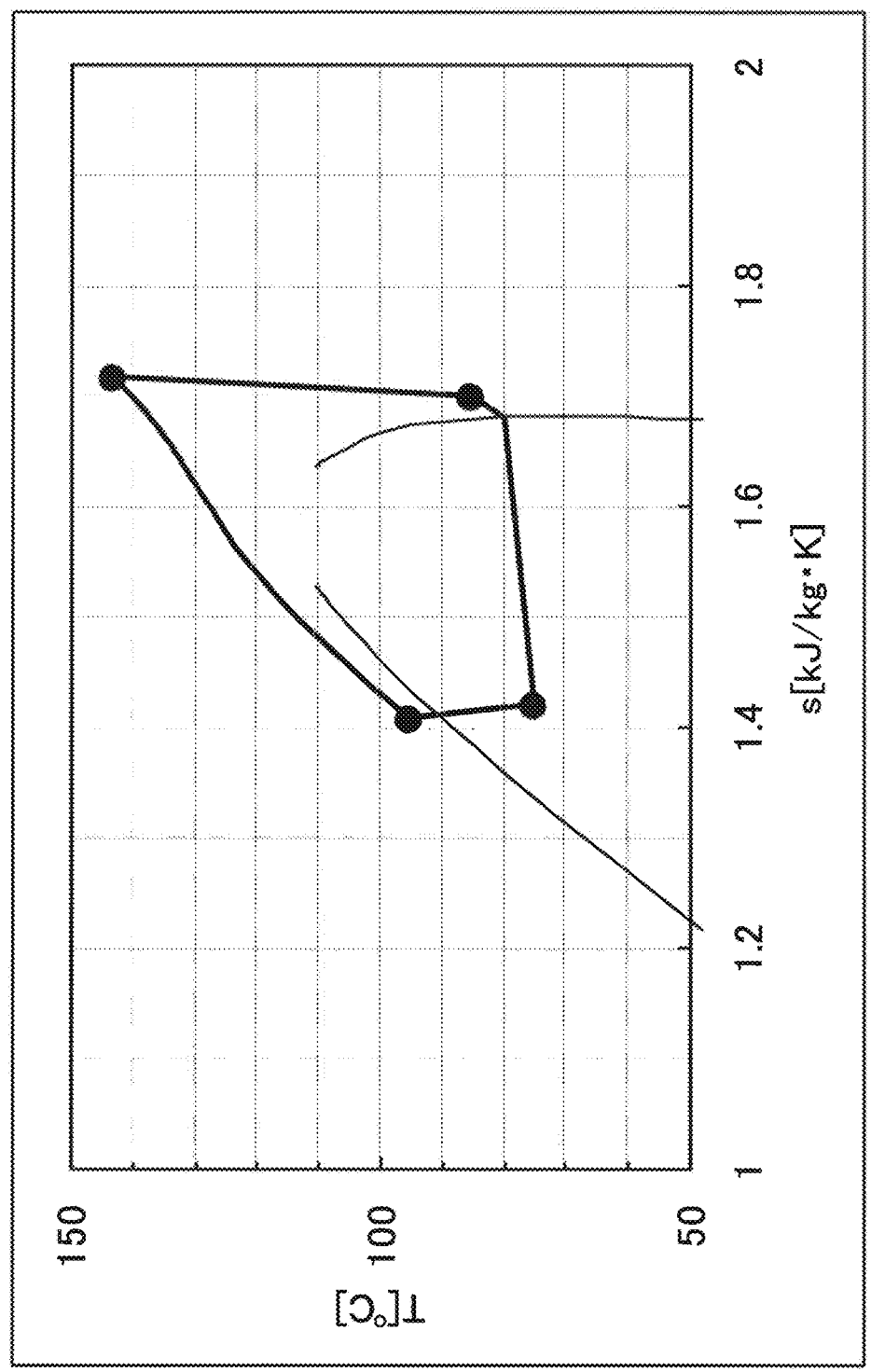
FIG. 18 is a T-s diagram in example 16 according to the present invention.

Mixed Heat Transmission Medium of cis-1,3,3,3-tetrafluoropropene: HFO-1234ze (Z) and 2,3,3,3-tetrafluoropropene: HFO-1234yf A mixed heat transmission medium of cis-1,3,3,3-tetrafluoropropene and 2,3,3,3-tetrafluoropropene was used as the mixed heat transmission medium to evaluate the steam compression cycle performance ($COP_H$) under the calculation conditions 6. The mixture ratio and the performance evaluation are shown in Table 28. FIG. 18 is a T-s diagram in example 16 in the case where HFO-1234ze (Z)/HFO-1234yf=30/70.

TABLE 28

| | | Heat transmission medium | | | | | | |
|---|---|---|---|---|---|---|---|---|
| | | HFO-1234ze(Z)/HFO-1234yf | | | | | | HFC-134a |
| Mass ratio | | 20/80 | 30/70 | 35/65 | 40/60 | 50/50 | 55/45 | — |
| Temperature at the compressor outlet | [° C.] | 142.8 | 143.0 | 143.2 | 143.3 | 143.7 | 143.9 | 142.8 |
| Evaporation pressure | [MPa] | 2.0 | 1.7 | 1.6 | 1.5 | 1.4 | 1.3 | 2.6 |
| Gas cooler pressure | [MPa] | 5.4 | 4.8 | 4.6 | 4.4 | 4.0 | 3.8 | 6.6 |
| Pressure ratio | [—] | 2.7 | 2.8 | 2.8 | 2.8 | 2.9 | 2.9 | 2.5 |
| Relative COP | [—] | 0.96 | 0.98 | 0.98 | 0.98 | 0.99 | 1.00 | 1.00 |
| Relative CAP | [—] | 0.74 | 0.68 | 0.66 | 0.63 | 0.58 | 0.56 | 1.00 |

From the results shown in Table 28, it has been made clear that under the calculation conditions 6 in which the evaporation temperature is 80° C. and the temperature at the outlet of the compressor is 140° C., HFO-1234ze (Z) is preferably contained at 30% by mass or more and HFO-1234yf is preferably contained at 70% by mass or less.

Example 17

Figure 19:
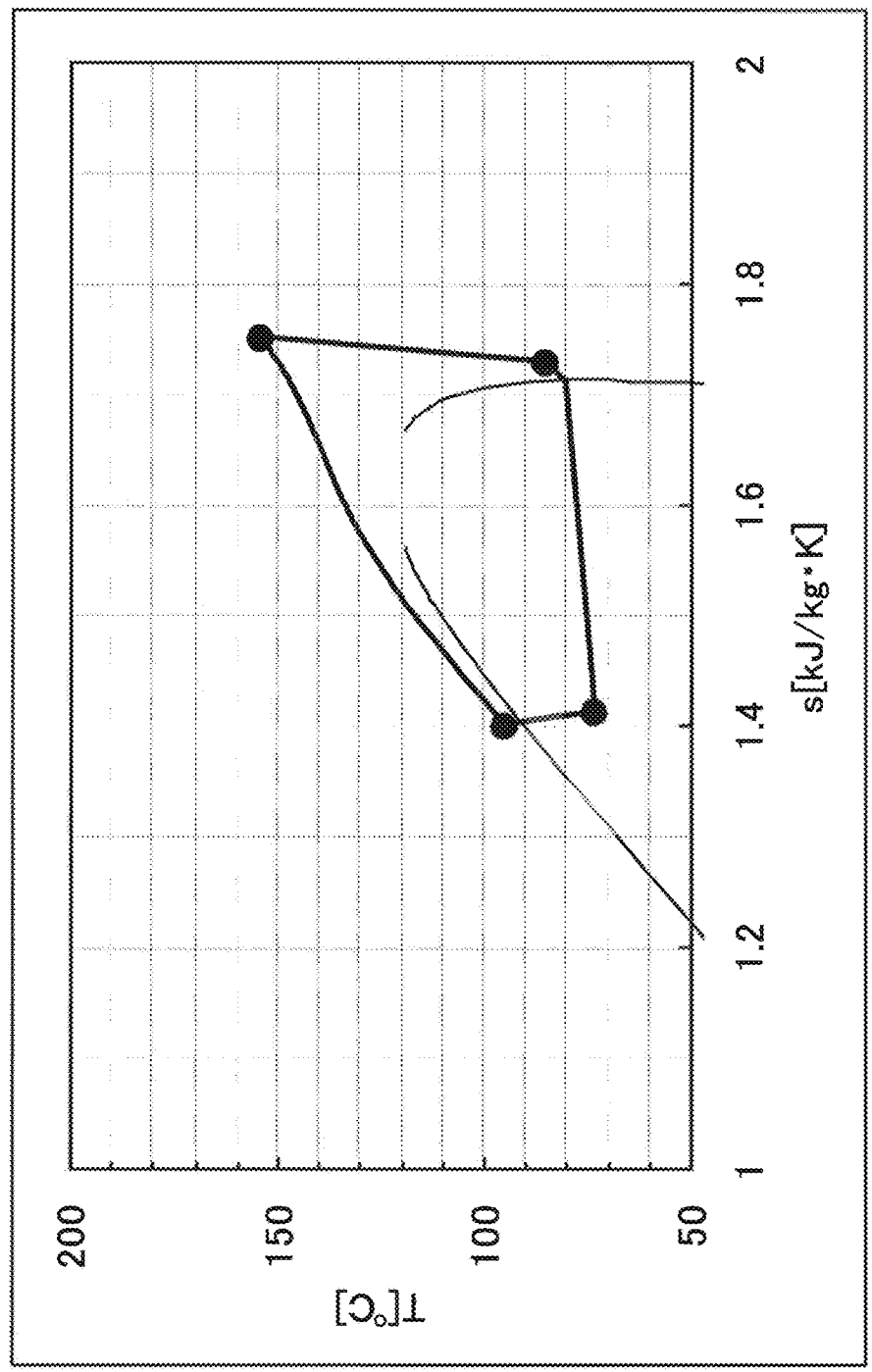
FIG. 19 is a T-s diagram in example 17 according to the present invention.

Mixed Heat Transmission Medium of cis-1,3,3,3-tetrafluoropropene: HFO-1234ze (Z) and 2,3,3,3-tetrafluoropropene: HFO-1234yf A mixed heat transmission medium of cis-1,3,3,3-tetrafluoropropene and 2,3,3,3-tetrafluoropropene was used as the mixed heat transmission medium to evaluate the steam compression cycle performance ($COP_H$) under the calculation conditions 7. The mixture ratio and the performance evaluation are shown in Table 29. FIG. 19 is a T-s diagram in example 17 in the case where HFO-1234ze (Z)/HFO-1234yf=45/55.

TABLE 29

| | | Heat transmission medium | | | | | | |
|---|---|---|---|---|---|---|---|---|
| | | HFO-1234ze(Z)/HFO-1234yf | | | | | | HFC-134a |
| Mass ratio | | 40/60 | 45/55 | 50/50 | 60/40 | 70/30 | 75/25 | — |
| Temperature at the compressor outlet | [° C.] | 153.7 | 153.8 | 153.9 | 154.2 | 154.4 | 154.5 | 153.6 |
| Evaporation pressure | [MPa] | 1.5 | 1.5 | 1.4 | 1.2 | 1.1 | 1.1 | 2.6 |
| Gas cooler pressure | [MPa] | 5.2 | 4.9 | 4.7 | 4.3 | 4.0 | 3.8 | 8.0 |
| Pressure ratio | [—] | 3.4 | 3.4 | 3.4 | 3.5 | 3.5 | 3.6 | 3.0 |
| Relative COP | [—] | 1.01 | 1.02 | 1.02 | 1.04 | 1.05 | 1.06 | 1.00 |
| Relative CAP | [—] | 0.62 | 0.59 | 0.57 | 0.53 | 0.50 | 0.48 | 1.00 |

From the results shown in Table 29, it has been made clear that under the calculation conditions 7 in which the evaporation temperature is 80° C. and the temperature at the outlet of the compressor is 150° C., HFO-1234ze (Z) is preferably contained at 45% by mass or more and HFO-1234yf is preferably contained at 55% by mass or less.

Example 18

Figure 20:
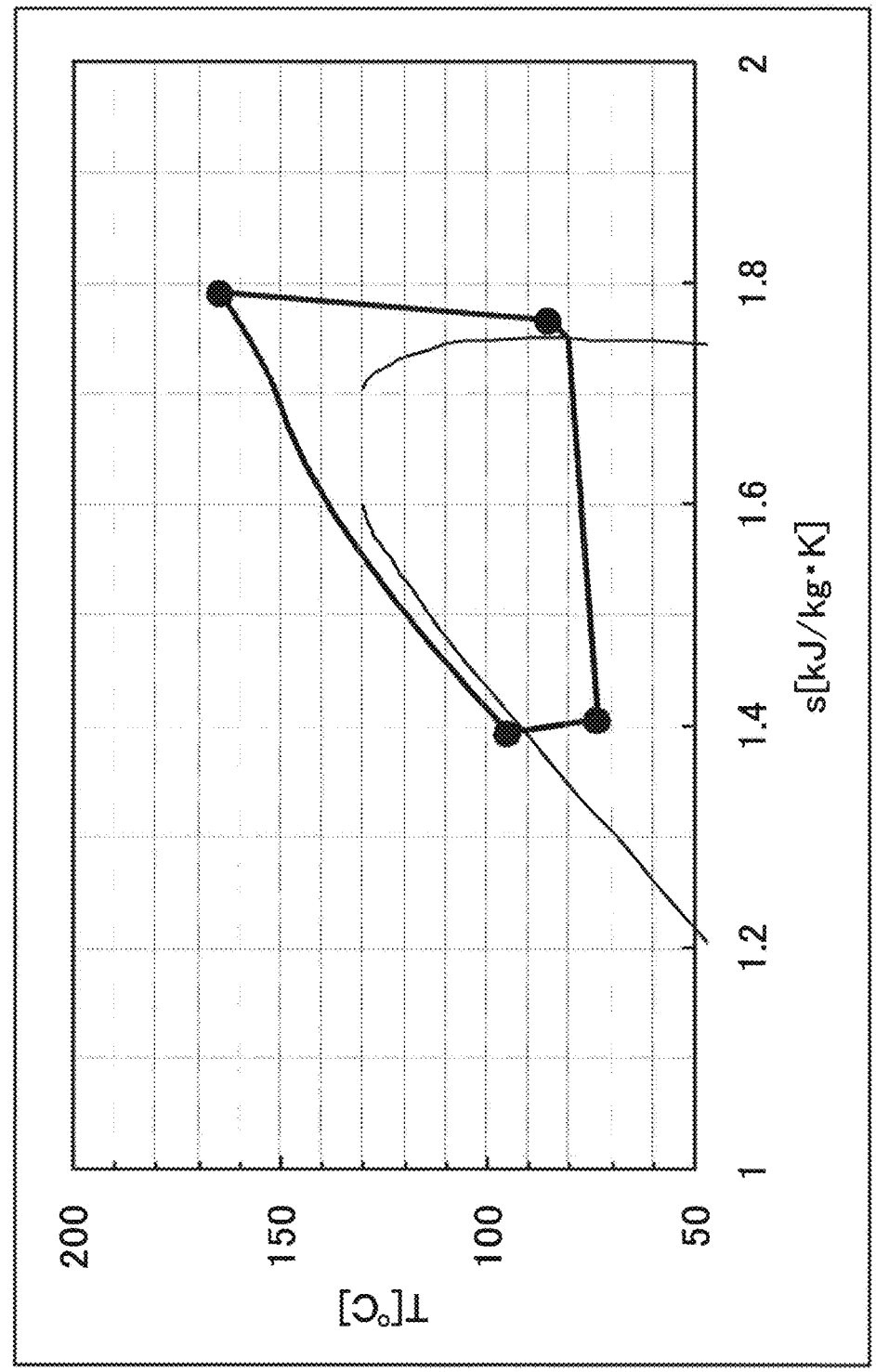
FIG. 20 is a T-s diagram in example 18 according to the present invention.

Mixed Heat Transmission Medium of cis-1,3,3,3-tetrafluoropropene: HFO-1234ze (Z) and 2,3,3,3-tetrafluoropropene: HFO-1234yf A mixed heat transmission medium of cis-1,3,3,3-tetrafluoropropene and 2,3,3,3-tetrafluoropropene was used as the mixed heat transmission medium to evaluate the steam compression cycle performance ($COP_H$) under the calculation conditions 8. The mixture ratio and the performance evaluation are shown in Table 30. FIG. 20 is a T-s diagram in example 18 in the case where HFO-1234ze (Z)/HFO-1234yf=65/35.

TABLE 30

| | | Heat transmission medium | | | | | |
|---|---|---|---|---|---|---|---|
| | | HFO-1234ze(Z)/HFO-1234yf | | | | | HFC-134a |
| Mass ratio | | 60/40 | 65/35 | 70/30 | 75/25 | 80/20 | 85/15 | — |
| Temperature at the compressor outlet | [° C.] | 164.5 | 164.5 | 164.6 | 164.6 | 164.7 | 164.7 | 164.8 |
| Evaporation pressure | [MPa] | 1.2 | 1.2 | 1.1 | 1.1 | 1.0 | 1.0 | 2.6 |
| Gas cooler pressure | [MPa] | 5.1 | 4.9 | 4.7 | 4.5 | 4.3 | 4.1 | 9.9 |
| Pressure ratio | [—] | 4.1 | 4.1 | 4.2 | 4.2 | 4.2 | 4.2 | 3.8 |
| Relative COP | [—] | 1.08 | 1.09 | 1.10 | 1.11 | 1.12 | 1.13 | 1.00 |
| Relative CAP | [—] | 0.52 | 0.50 | 0.48 | 0.47 | 0.45 | 0.44 | 1.00 |

From the results shown in Table 30, it has been made clear that under the calculation conditions 8 in which the evaporation temperature is 80° C. and the temperature at the outlet of the compressor is 160° C., HFO-1234ze (Z) is preferably contained at 65% by mass or more and HFO-1234yf is preferably contained at 35% by mass or less.

Example 19

Iron, copper and aluminum test pieces were put into an autoclave having an inner volume of 120 mL and formed of SUS316, and air remaining in the autoclave was removed by a vacuum pump. Then, about 30 g of coolant was put into the autoclave. The autoclave was heated for 28 days in an air thermostatic tank set to 200° C. The density of the coolant was adjusted such that the pressure of the coolant would be about 5 MPa at 200° C. A control experiment was also performed under the condition that no metal test piece was put into the autoclave.

The coolant was recovered from the autoclave, and the composition, the acid concentration and the external appearance of the coolant were measured. Then, the metal test pieces were removed from the autoclave. The mass and the size of the metal test pieces were measured, and the corrosion rate was calculated by use of the pre-test mass and size measured in advance. The results are shown in Tables 31 and 32.

TABLE 31

| Coolant | Metal test piece | Purity [GC %] | 1234ze(E) [GC %] | Acid content [ppm] | External appearance |
|---|---|---|---|---|---|
| 1234ze(Z) | Before the test | 99.93 | <0.00 | <0.0 | Colorless, transparent |
| | Fe, Cu, Al | 99.92 | <0.00 | 0.3 | Colorless, transparent |
| | None | 99.91 | <0.00 | 0.2 | Colorless, transparent |
| 245fa | Before the test | 99.98 | <0.00 | <0.0 | Colorless, transparent |
| | Fe, Cu, Al | 99.98 | <0.00 | 0.1 | Colorless, transparent |
| | None | 99.98 | <0.00 | 1.0 | Colorless, transparent |

TABLE 32

| Coolant | Metal test piece | Corrosion rate [mm/y] | External appearance |
|---|---|---|---|
| 1234ze(Z) | Fe | <0.00000 | Maintain metallic luster |
| | Cu | 0.00013 | Maintain metallic luster |
| | Al | <0.00000 | Maintain metallic luster |
| 245fa | Fe | <0.00000 | Maintain metallic luster |
| | Cu | <0.00000 | Maintain metallic luster |
| | Al | <0.00000 | Maintain metallic luster |

The composition of each of the coolants was analyzed by a gas chromatograph. Despite being kept for 28 days in a supercritical state having a temperature of 200° C. and a pressure of 5 MPa, all of the coolants maintained the pre-heating purity. No new thermal decomposition product was observed, and conversion from the cis isomer of HFO-1234ze into a trans isomer thereof was not observed. The acid content of each of the coolants was analyzed by an ion chromatograph. The acid content ($F^-$ ion) was less than 1 ppm. The coolants recovered after the test were kept colorless and transparent, and were not changed from the pre-test state. As seen from Table 31, the coolants used in the present invention have high thermal stability even in a supercritical state.

The metal test pieces, which were in contact with the coolants in a supercritical state having a temperature of 200°

C. and a pressure of 5 MPa for 28 days, each exhibited a very low corrosion rate. The recovered test pieces maintained luster of the metal surface. The surface of the autoclave formed of SUS316, which was in contact with the coolant in the autoclave, maintained the metallic luster, and was not corroded. When being put into a supercritical state, a compound may occasionally corrode a material which is not corroded by the compound in a gaseous or liquid state. By contrast, the coolants used in the present invention did not corrode the metal even in a supercritical state. As seen from Table 32, the coolants used in the present invention have high material compatibility.

INDUSTRIAL APPLICABILITY

The present invention is directed to a heat transmission method of transmitting, by a heat releasing step, heat of a non-flammable or slightly flammable coolant having little load on the environment from a supercritical state to a fluid to be heated. Under the heat transmission temperature condition of 80° C. or higher, this method is usable more preferably than a conventional heat transmission method using a condensation step performed at a temperature lower than, or equal to, the critical temperature of the coolant. This method, which provides a superb coefficient of performance and a superb volume capability, significantly contributes to reduction of power consumption. Warm water in a middle to low temperature range, which is not fully utilized conventionally, may be heated by the method according to the present invention and used as high quality warm water, pressurized hot water or superheated steam. The heat transmission medium used in the present invention does not substantially contribute to global warming, unlike many types of hydrofluorocarbon currently used.

The present invention provides a non-flammable or slightly flammable heat transmission medium or working medium for a heat cycle that has little load on the environment and has superb heat transmission characteristics, and also provides a high-temperature heat pump device.

The invention claimed is:

1. A heat transmission method using a heat pump system, the method comprising:
   (A) step of gasifying a heat transmission medium;
   (B) step of compressing the heat transmission medium into a supercritical state by a condensation pressure of 5.0 MPa or lower;
   (C) step of causing heat exchange between the heat transmission medium in the supercritical state at the condensation pressure of 5.0 MPa or lower and a medium to be heated to heat the medium to be heated to 80° C. or higher; and
   (D) step of decreasing the pressure of the heat transmission medium,
   wherein the heat transmission medium contains cis-1,3,3,3-tetrafluoropropene at 80% by mass or more and 99% by mass or less and contains 1,1,1,3,3-pentafluoropropane at 1% by mass or more and 20% by mass or less.

2. The heat transmission method according to claim 1, wherein in step (C), the medium to be heated is heated to 100° C. or higher.

3. The heat transmission method according to claim 1, wherein in step (C), the medium to be heated is heated to 150° C. or higher.

4. The heat transmission method according to claim 1, wherein in step (C), the medium to be heated is heated to 170° C. or higher.

5. The heat transmission method according to claim 1, further comprising a step (E) of supplying the heat transmission medium to step (A).

6. The heat transmission method according to claim 1, wherein the heat transmission medium contains a lubricant.

7. The heat transmission method according to claim 6, wherein the lubricant is selected from mineral oil and synthetic oils including alkylbenzenes, poly(alfa-olefin), esters, polyolesters, polyalkyleneglycols, polyvinylethers, and a combination thereof.

8. The heat transmission method according to claim 1, wherein the heat transmission medium further contains a stabilizer.

9. The heat transmission method according to claim 8, wherein the stabilizer is selected from nitro compounds, epoxy compounds, phenols, imidazoles, amines, diene-based compounds, phosphates, aromatic unsaturated hydrocarbons, isoprenes, propadienes, terpenes, and a combination thereof.

10. The heat transmission method according to claim 1, wherein the heat transmission medium further contains a flame retardant.

11. The heat transmission method according to claim 10, wherein the flame retardant is selected from phosphates, halogenated aromatic compounds, fluorinated iodocarbon, fluorinated bromocarbon, and a combination 5 thereof.

12. A high-temperature heat pump device using the heat transmission method according to claim 1.

13. The high-temperature heat pump device according to claim 12, wherein the high-temperature heat pump device generates warm water of 80° C. or higher.

14. The high-temperature heat pump device according to claim 12, wherein the high-temperature heat pump device generates pressurized hot water or superheated steam of 100° C. or higher.

15. The high-temperature heat pump device according to claim 12, wherein the high-temperature heat pump device generates pressurized hot water or superheated steam of 130° C. or higher.

16. The high-temperature heat pump device according to claim 12, wherein the high-temperature heat pump device generates pressurized hot water or superheated steam of 150° C. or higher.

17. The high-temperature heat pump device according to claim 12, wherein the high-temperature heat pump device generates pressurized hot water or superheated steam of 170° C. or higher.

18. The heat transmission method according to claim 1, wherein the heat transmission medium contains cis-1,3,3,3-tetrafluoropropene at 90% by mass or more and 99% by mass or less and contains 1,1,1,3,3-pentafluoropropane at 1% by mass or more and 10% by mass or less.

* * * * *